United States Patent
MeLampy et al.

(10) Patent No.: US 11,323,328 B2
(45) Date of Patent: *May 3, 2022

(54) USER INFORMATION METHOD AND APPARATUS FOR DIRECTING LINK-LAYER COMMUNICATION

(71) Applicant: 128 Technology, Inc., Burlington, MA (US)

(72) Inventors: Patrick MeLampy, Dunstable, MA (US); Abilash Menon, Boxborough, MA (US); Michael Baj, Somerville, MA (US); Prashant Kumar, Andover, MA (US)

(73) Assignee: 128 Technology, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/011,174

(22) Filed: Sep. 3, 2020

(65) Prior Publication Data

US 2022/0070062 A1    Mar. 3, 2022

(51) Int. Cl.
*H04L 12/24* (2006.01)
*H04L 41/0893* (2022.01)
*H04L 29/06* (2006.01)
*H04L 45/00* (2022.01)

(52) U.S. Cl.
CPC .......... *H04L 41/0893* (2013.01); *H04L 45/34* (2013.01); *H04L 45/66* (2013.01); *H04L 45/72* (2013.01); *H04L 63/08* (2013.01); *H04L 63/0807* (2013.01); *H04L 63/18* (2013.01)

(58) Field of Classification Search
CPC ..... H04L 41/0893; H04L 45/66; H04L 63/08; H04L 63/18
See application file for complete search history.

(56) References Cited

U.S. PATENT DOCUMENTS

| | | | |
|---|---|---|---|
| 10,511,590 B1 * | 12/2019 | Bosch | H04L 45/38 |
| 10,659,434 B1 | 5/2020 | Kim et al. | |
| 2008/0285560 A1 * | 11/2008 | Curtis | H04L 45/121 370/392 |
| 2009/0265327 A1 * | 10/2009 | Zou | H04M 7/0075 |

(Continued)

OTHER PUBLICATIONS

U.S. Appl. No. 17/011,181, filed Sep. 3, 2020, naming inventors MeLampy et al.

(Continued)

*Primary Examiner* — Gil H. Lee
(74) *Attorney, Agent, or Firm* — Shumaker & Sieffert, P.A.

(57) ABSTRACT

A network device has an input configured to receive a message relating to a given user attempting to forward one or more packets across a computer network. The message has given user information relating to the given user. In addition, the routing device also has a selector, operatively coupled with the input, configured to select (after receiving the message) a given group routing policy from a plurality of group routing policies. Preferably, the selector is configured to select the given group routing policy as a function of the given user information. The routing device also has an output operatively coupled with the selector. The output is configured to cause routing of user communication across the network using link-layer routes specified by the given group routing policy.

23 Claims, 22 Drawing Sheets

(56) References Cited

U.S. PATENT DOCUMENTS

| | | | | |
|---|---|---|---|---|
| 2014/0237539 | A1* | 8/2014 | Wing | H04L 69/22 726/1 |
| 2015/0188810 | A1* | 7/2015 | Salkintzis | H04L 45/38 370/328 |
| 2017/0054688 | A1 | 2/2017 | Bhattacharjee et al. | |
| 2017/0310579 | A1 | 10/2017 | Hayes | |
| 2019/0158625 | A1* | 5/2019 | Papageorgiou | H04L 67/18 |

OTHER PUBLICATIONS

Office Action dated Apr. 16, 2021 in U.S. Appl. No. 17/011,181, 17 pp.

Response to the Office Action dated Apr. 16, 2021 in U.S. Appl. No. 17/011,181, filed Jul. 16, 2021, 11 pp.

Final Office Action dated Oct. 15, 2021 in U.S. Appl. No. 17/011,181, 11 pp.

Response to the Final Office Action dated Oct. 15, 2021 in U.S. Appl. No. 17/011,181, filed Dec. 3, 2021, 12 pp.

YouTube "Identity Context Driver from 128 Technology (2)" 128 Technology, uploaded Aug. 17, 2020, accessed from YouTube at https://www.youtube.com/watch?v=dWNGi_k8ZJk.

Extended Search Report from counterpart European Application No. 21194665.2 dated Jan. 26, 2022, 8 pp.

Notice of Allowance from U.S. Appl. No. 17/011,181, dated Jan. 4, 2022, 13 pp.

U.S. Appl. No. 17/649,629, filed Feb. 1, 2022, naming inventors Schumann III et al.

* cited by examiner

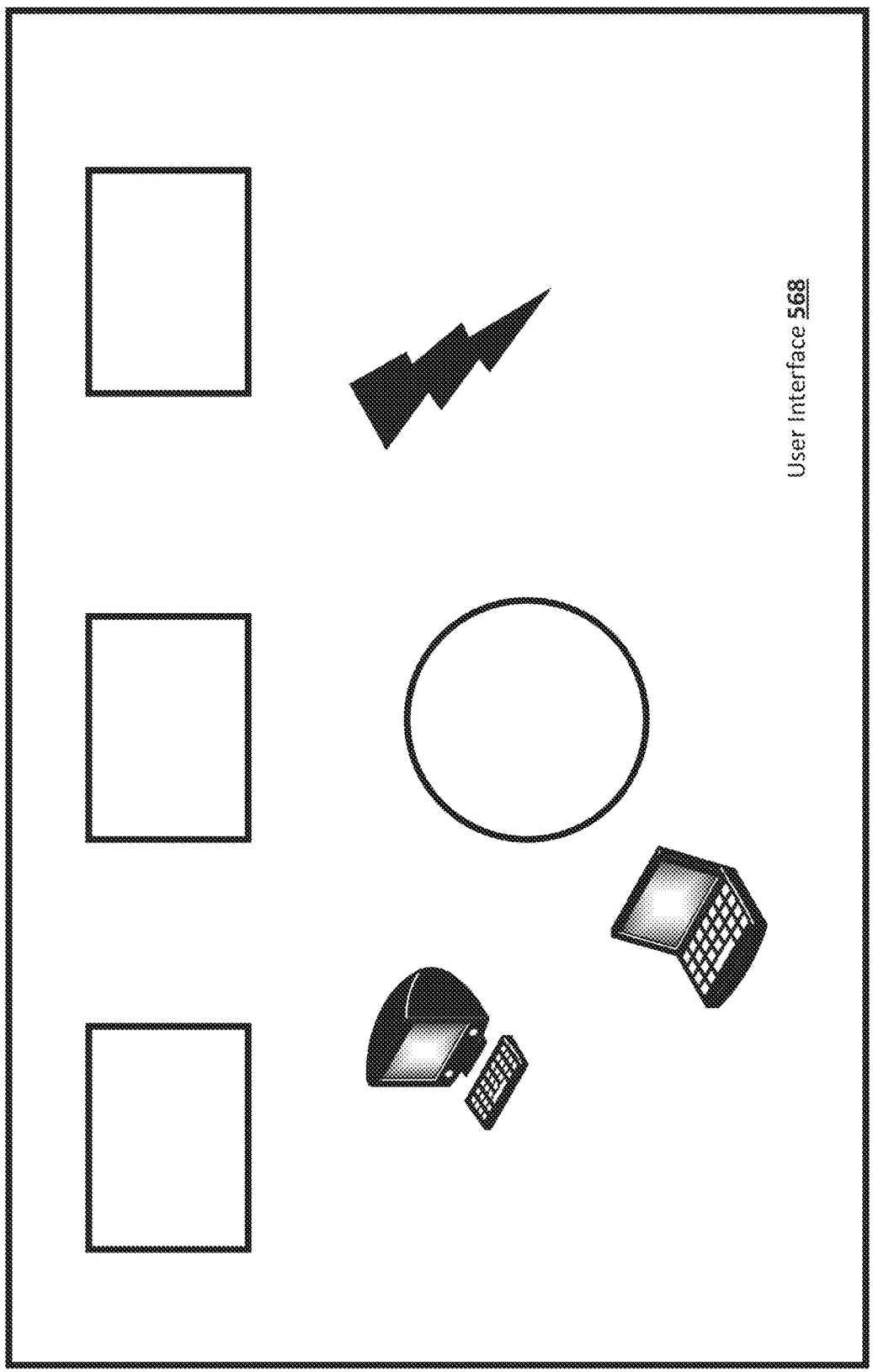

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type = 7      |       |      Length = ?                   |
+-+-+-+-+-+-+-+-+-+-+-+-+-+-+-+-+-+-+-+-+-+-+-+-+-+-+-+-+-+-+-+-+
|                              Name                             |
+-+-+-+-+-+-+-+-+-+-+-+-+-+-+-+-+-+-+-+-+-+-+-+-+-+-+-+-+-+-+-+-+
```

FIG. 20

USER INFORMATION METHOD AND APPARATUS FOR DIRECTING LINK-LAYER COMMUNICATION

RELATED APPLICATION

This patent application is related to U.S. patent application Ser. No. 17/011,181, filed on Sep. 3, 2020, and entitled "DEVICE INFORMATION METHOD AND APPARATUS FOR DIRECTING LINK-LAYER COMMUNICATION," and naming Patrick MeLampy and Abilash Menon as inventors, the disclosure of which is incorporated herein, in its entirety, by reference.

FIELD OF THE INVENTION

Illustrative embodiments of the generally relate to computer networks and, more particularly, various embodiments of the invention relate to managed link-layer routing across a computer network.

BACKGROUND OF THE INVENTION

Routers transmit data across the Internet using the Internet Protocol ("IP"). As known by those in the art, IP serves as the de-facto standard for forwarding data messages ("datagrams") between network devices connected with the Internet. To that end, IP delivers datagrams across a series of Internet devices, such as routers, in the form of one or more data packets.

Users often undergo authentication processes of varying complexities to gain access to an application, service, or the Internet. For example, an Application layer program may produce a graphical user interface requesting that the user enter a login name and password. While effective for many uses, such technology lacks certain flexibility and network security.

SUMMARY OF VARIOUS EMBODIMENTS

In accordance with one embodiment of the invention, a network device has an input configured to receive a message relating to a given user attempting to forward one or more packets across a computer network. The message has given user information relating to the given user. In addition, the routing device also has a selector, operatively coupled with the input, configured to select (after receiving the message) a given group routing policy from a plurality of group routing policies. Preferably, the selector is configured to select the given group routing policy as a function of the given user information. The routing device also has an output operatively coupled with the selector. The output is configured to cause routing of user communication across the network using link-layer routes specified by the given group routing policy.

The network device also may include or use a policy database that is operatively coupled with the selector. The policy database is configured to contain the plurality of group routing policies. An assignor also may be operatively coupled with the selector. The assignor may be configured to assign the given group routing policy to the given user.

The message may relate to authenticating for communication across the network using link-layer routes (e.g., from the OSI model) specified in at least one of a plurality of packets. In that case, the output may have a packet modifier, operatively coupled with the selector, configured to modify at least one of the plurality of packets with route information relating to the given group routing policy.

Some embodiments may have an authenticator operatively coupled with the input and configured to enable execution of authentication processes of the given user using the given user information. Various embodiments may use other criteria for route selection. For example, when the given user uses an associated given communication device, the selector may be configured to select the given group routing policy as a function of the given communication device.

The plurality of group routing policies may be configured in a number of manners. For example, they may include at least one group routing policy configured to permit access on link-layer routes without link restriction. As another example, the plurality of group routing policies also may include at least one group routing policy configured to permit access on link-layer routes specified in the given group routing policy. Thus, the group routing policies may include a mix of these two types of policies. Alternatively or in addition, the plurality of group routing policies may include a hierarchical set of group routing policies. For example, at least one of the plurality of group routing policies having at least one sub-group routing policy.

The routing device preferably is generally invisible to the user. To that end, the input may be configured to receive the given request to authenticate from a graphical user interface. As such, the input and selector are configured to not affect the graphical user interface—e.g., not producing any new indicia as a result of processing by the input and/or selector. To optimize communications, the routing device further include a stateful router configured for directing the user communications across a stateful route (as opposed to traditional non-stateful IP routing).

In accordance with another embodiment of the invention, a routing method receives a message relating to a given user attempting to forward one or more packets across a computer network. The message has given user information relating to the given user. Next, the method selects, after receiving the given data, a given group routing policy from a plurality of group routing policies. The given group routing policy preferably is selected as a function of the given user information. Finally, the method assigns the given group routing policy to the given user, and directs (in some instances, after authentication) routing of user communication across the network using link-layer routes specified by the given group routing policy.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 8 schematically shows a graphical user interface that may be used in accordance with illustrative embodiments of the invention.

FIG. 20 depicts an exemplary format of tenant information following the metadata header of FIG. 19 in accordance with the techniques of the disclosure

DESCRIPTION OF ILLUSTRATIVE EMBODIMENTS

In illustrative embodiments, a device can implement policies at the link-layer to better control routing across a Layer 3 network (e.g., the Internet). To that end, after determining information relating to a user, a routing filter can route packets across the Internet via a pre-specified network path based on information relating to that specific user. In other embodiments, after determining information about the network device that is to communicate across the network, a routing filter can route packets across the Internet via a pre-specified network path based on information relating to that specific network device. For even further control, the routing filter can route packets across the Internet via a pre-specified network path based on information relating to both the user and network device. Details of illustrative embodiments are discussed below.

Networks

Illustrative embodiments preferably are implemented on a conventional computer network. Among other things, a network includes at least two nodes and at least one link between the nodes. Nodes can include computing devices (sometimes referred to as hosts) and routers. Computers include personal computers, smart phones, automatic teller machines (ATMs) and many other types of equipment that include processors and network interfaces. Links include wired and wireless connections between pairs of nodes. In addition, nodes and/or links may be implemented completely in software, such as in a virtual machine, a software defined network, and using network function virtualization. Many networks include switches, which are largely transparent for purposes of this discussion. However, some switches also perform routing functions. For the present discussion, such routing switches are considered routers. Routers are described below.

Figure 1:
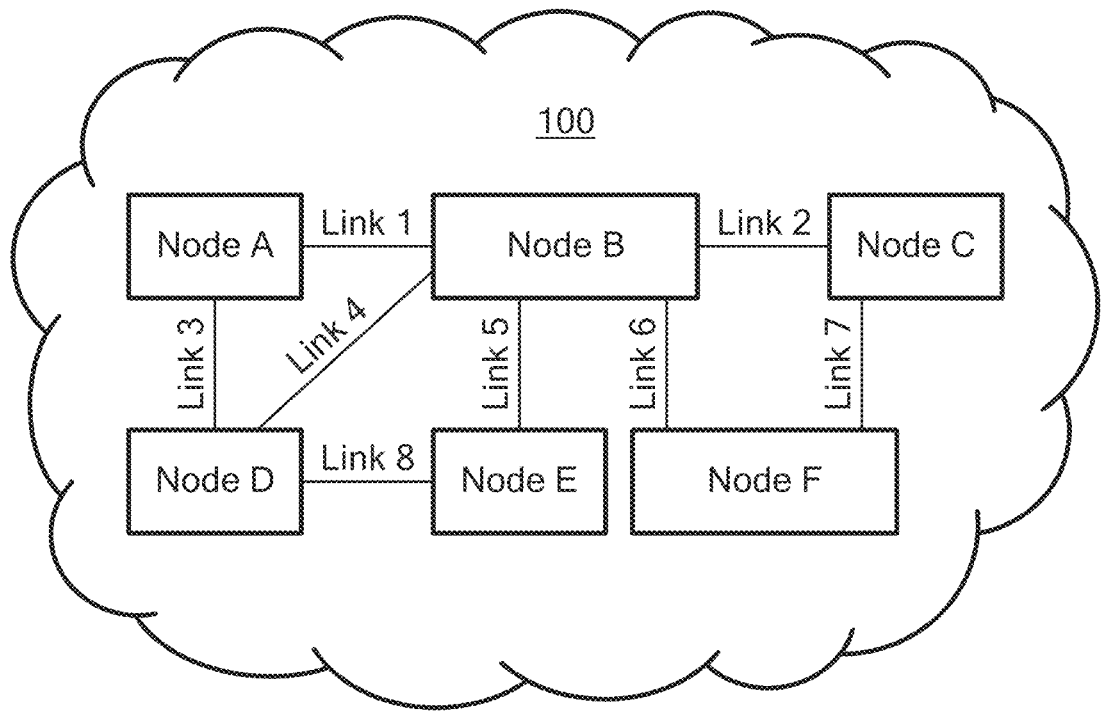
FIG. 1 schematically shows a hypothetical prior art network that may implement illustrative embodiments of the invention.

A node can be directly connected to one or more other nodes, each via a distinct link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme and all the links that interconnect the nodes for communication according to the network's addressing scheme. For example, in FIG. 1, Node A, Node B, Node C, . . . Node F and all the links 1-8 together make up a network 100. For simplicity, a network is depicted as a cloud or as being enclosed within a cloud.

Nodes initiate communications with other nodes via the network, and nodes receive communications initiated by other nodes via the network. For example, a node may transmit/forward/send data (a message) to a directly connected (adjacent) node by sending the message via the link that interconnects the adjacent nodes. The message includes the network address of the sending node (the "source address") and the network address of the intended receiving node (the "destination address"). A sending node can send a message to a non-adjacent node via one or more other nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and above noted Transmission Control Protocol (TCP). The protocols are typically implemented by layered software and/or hardware components according to the well-known seven-layer Open System Interconnect (OSI) model. As an example, IP operates at OSI Layer 3 (Network Layer), while the TCP operates largely at OSI Layer 4 (Transport Layer). Each layer performs a logical function and abstracts the layer below it, therefore hiding details of the lower layer.

Figure 2:
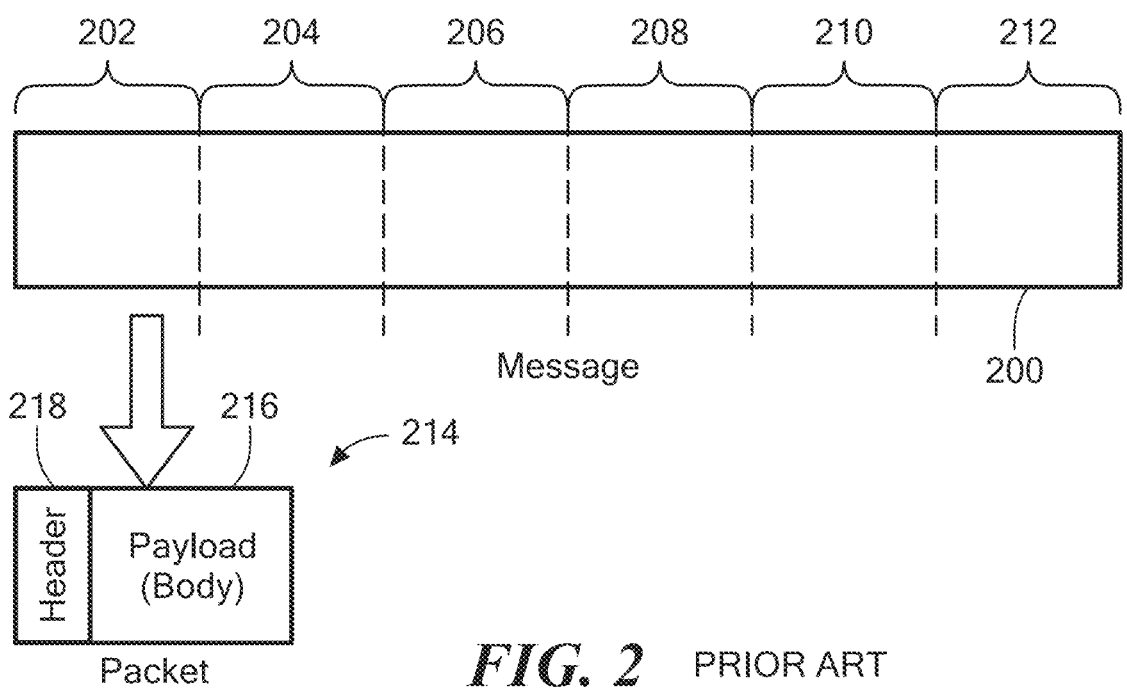
FIG. 2 schematically illustrates a prior art technique for fragmenting a message.

For example, Layer 3 may fragment a large message into smaller packets if Layer 2 (Data Link Layer) cannot handle the message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the well-known TCP protocol fragments data into segments, officially referred to as TCP protocol data units (PDUs). Nevertheless, in common usage, the term packet is used to refer to PDUs and datagrams, as well as Ethernet frames.

Most protocols encapsulate packets of higher layer protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface. At Layer 2 (Data Link Layer), each interface has an address, such as a media access control (MAC) address. On the other hand, at Layer 3 using IP, each interface, or at least each node, has an IP address. Layer 3 is used to find gateways to get an IP packet from the source to the destination.

Figure 3:
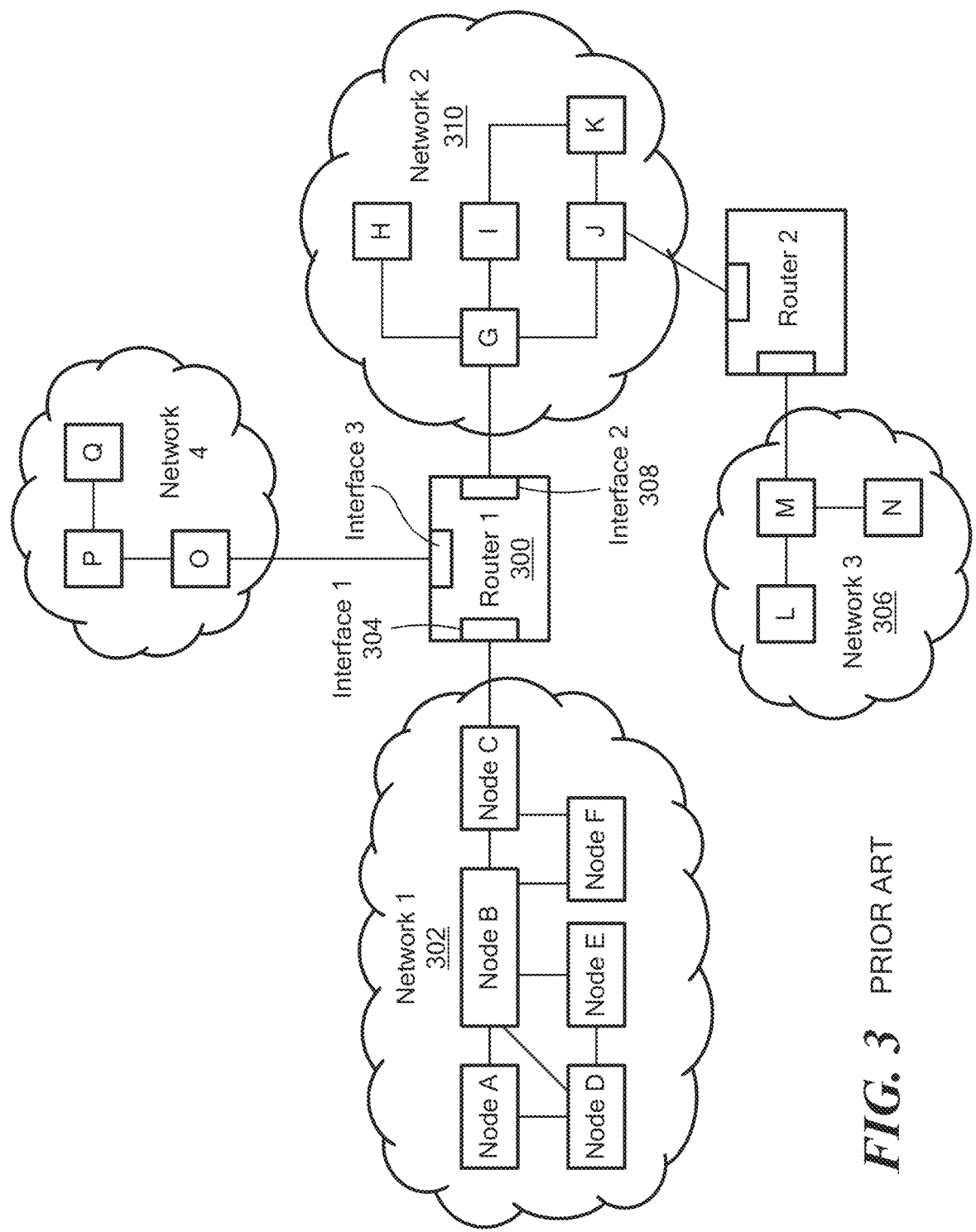
FIG. 3 schematically shows a hypothetical internet that may implement illustrative embodiments of the invention.

A router typically acts as a node that interconnects two or more distinct networks or two or more sub-networks (subnets) of a single network, thereby creating a "network of networks" (i.e., an internet). Thus, a router has at least two interfaces; i.e., one where each interface connects the router to a different network, as exemplified in FIG. 3. When a router receives a packet via one interface from one network, it uses information stored in its routing table to direct the packet to another network via another interface. The routing table thus contains network/next hop associations. These associations tell the router that a particular destination can optimally be reached by sending the packet to a specific router that represents a next hop on the way to the final destination. For example, if Router 1 300 receives a packet, via its Interface 1 304, from Network 1 302, and the packet is destined to a node in Network 3 306, the Router 1 300 consults its router table and then forwards the packet via its Interface 2 308 to Network 2 310. Network 2 310 will then forward the packet to Network 3 306. The next hop association can also be indicated in the routing table as an outgoing (exit) interface to the final destination.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain any historical information about the packet, although the forwarding action may be collected to generate statistical data if the router is so configured. Illustrative embodiments discussed below relate to an improved apparatus and method for optimizing statistical data generation and collection.

As noted, when a router receives a packet via one interface from one network, the router uses its routing table to direct the packet to another network. Table 1 lists information typically found in a basic IP routing table.

TABLE 1

| | |
|---|---|
| Destination | Partial IP address (Expressed as a bit-mask) or Complete IP address of a packet's final destination |
| Next hop | IP address to which the packet should be forwarded on its way to the final destination |
| Interface | Outgoing network interface to use to forward the packet |
| Cost/Metric | Cost of this path, relative to costs of other possible paths |
| Routes | Information about subnets, including how to reach subnets that are not directly attached to the router, via one or more hops; default routes to use for certain types of traffic or when information is lacking |

Routing tables may be filled in manually, such as by a system administrator, or dynamically by the router. The router uses routing protocols to exchange information with other routers and, thereby, dynamically learns about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet and router or link failures.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet or between two successive packets of a message, such as if a router becomes congested or a link fails. Two packets of a message may, therefore, follow different paths and even arrive out of order. In other words, when a packet is sent by a source node, there is no predetermined path the packet will take between the source node and the packet's destination. Instead, the path typically is dynamically determined as the packet traverses the various routers. This may be referred to as "natural routing," i.e., a path is determined dynamically as the packet traverses the internet.

It should be noted that conventionally, packets sent by the destination node back to the source node may follow different paths than the packets from the source node to the destination node.

In many situations, a client computer node establishes a session with a server computer node, and the client and server exchange packets within the session. For example, a client computer executing a browser may establish a session with a web server. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes.

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a prescribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer device having a single IP address may provide several services, such as web services, e-mail services and file transfer (FTP) services. The number of addresses a computer has is orthogonal to the number of services it may provide, although it has at least one. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request. The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Dynamic IP Routing

Figure 4:
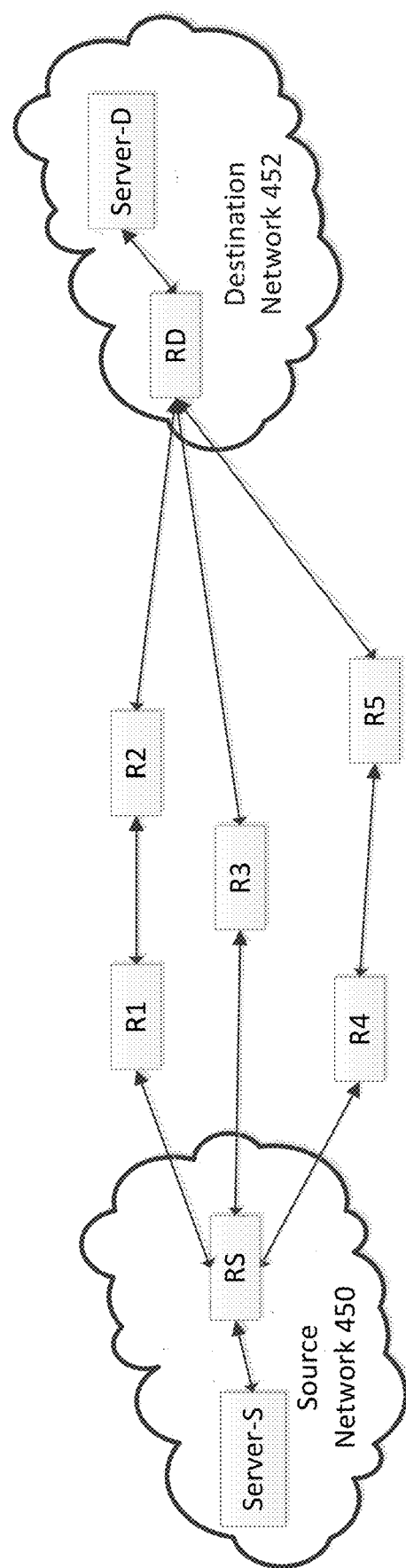
FIG. 4 schematically shows an example of a specific network that may implement illustrative embodiments of the invention.

As noted above, in illustrative embodiments, a network device more controllably routes a stream or session of packets across a network between a source and a destination. FIG. 4 schematically shows an exemplary network that may be used to implement various embodiments. The network of FIG. 4 is significantly simplified to more easily understand details of various embodiments of the invention. Accordingly, discussion of the network of FIG. 4 is merely for illustrative purposes only and thus, not intended to limit various embodiments of the invention to this particular network.

As shown, the network of FIG. 4 includes a source network 450 that communicates with a destination network 452 across a plurality of different intermediate network devices R1-R5. To that end, the source network 450 has a server (identified in the figure as "Server-S") that communicates with the intermediate network devices R1-R5 through a local source router RS. In illustrative embodiments, the local source router RS acts as an edge router for the source network 450. In a corresponding manner, the destination network 452 also has a server (identified in the figure as "Server-D") that communicates with the source network 450 using the intermediate network devices R1-R5 and a local destination router RD.

The intermediate network devices R1-R5 may be any of a variety of routing and switching devices. For illustrative purposes, the intermediate network devices R1-R5 are discussed herein as routers. It nevertheless should be noted that discussion of routers should not limit various embodiments of the invention. Moreover, the intermediate network devices R1-R5 may be connected/communicate in a variety of conventional manners. For example, they may communicate through the Internet, and/or be part of some administrative domain or local network. In illustrative embodiments, one or more of the routing devices R1-R5 implement stateful routing (e.g., "augmented IP routers," or "AIPRs," discussed below).

The source network 450 and destination network 452 may transmit/forward any of a wide variety of different types of data. For example, the source network 450 may forward a request for information from a medical database, or a request for access to a video or audio service. Thus, in the latter case, the destination network 452 may provide a video streaming service (e.g., NETFLIX™ or YOUTUBE™ services) to an end user back at the source network 450. As a second example, in response to a request for service from the source networks 450, the destination network 452 may provide an audio streaming service (e.g., PANDORA service) to an end user at the source network 450. It therefore should be noted that designation as "source" or "destination" networks 450 or 452 does not imply that they act solely in those capacities. Instead, the source network 450 may act as both a source and destination for certain traffic. In a similar manner, the destination network 452 may act as both as source and destination for certain traffic. Designation as source and destination networks 450 and 452 thus is for convenience as to the network that initiates a session and thus, is not intended to limit their functionality as both a destination and/or a source.

Indeed, the source network 450, destination network 452, and intermediate network devices R1-R5 shown in FIG. 4 are significantly simplified to more easily understand various embodiments. Accordingly, the source network 450 and destination network 452 each may have a wide variety of additional devices, such as additional routers, computers, network appliances, additional servers, etc.

As noted above, illustrative embodiments solve a significant network problem—selective access to, tracking, and control of network resources. For example, a hospital typically has strict policies relating to access of confidential patient medical information. Accordingly, non-essential personnel may not have access to such information. Prior art techniques known to the inventors solved that problem by using Application layer security programs. Undesirably, such a solution creates additional problems. Recognizing these problems, the inventors discovered that rather than using Application layer techniques, they could effectively and in many ways more efficiently control access and security to various network resources using link-layer techniques (aka "Layer 3" techniques).

More specifically, illustrative embodiments use information relating to 1) the user, 2) a specific device or device type, or 3) both the user and device/device type, to route communication between a source and destination along one or more prespecified link-layer paths (e.g., from router to router). To that end, a filter may receive information or data relating to a device or user and select which link-layer route(s) a session or packet stream shall take. This process may be completed without the knowledge of the user in the session. As such, FIG. 5 generically shows a filter 550 that receives information about a device (e.g., the Server-S of the source network 450) and/or user (e.g., a doctor in a hospital network), and determines the appropriate paths or links to use based on that data. The system thus causes the relevant data traffic to take those routes. Accordingly, the filter 550 dynamically determines the appropriate route(s) prior to transmitting the session packets.

The filter 550 enables a wide variety of additional functionality. For example, a user signing on in an "unfriendly" country or specified region may be routed differently than that same user would be routed if they had signed on in a "friendly" or other country. Importantly, that different routing should be transparent from the perspective of the user and/or their device. To protect against hacking, that sign-on in the unfriendly country can be routed to spoofed sites, such as a "honeypot."

Figure 6:
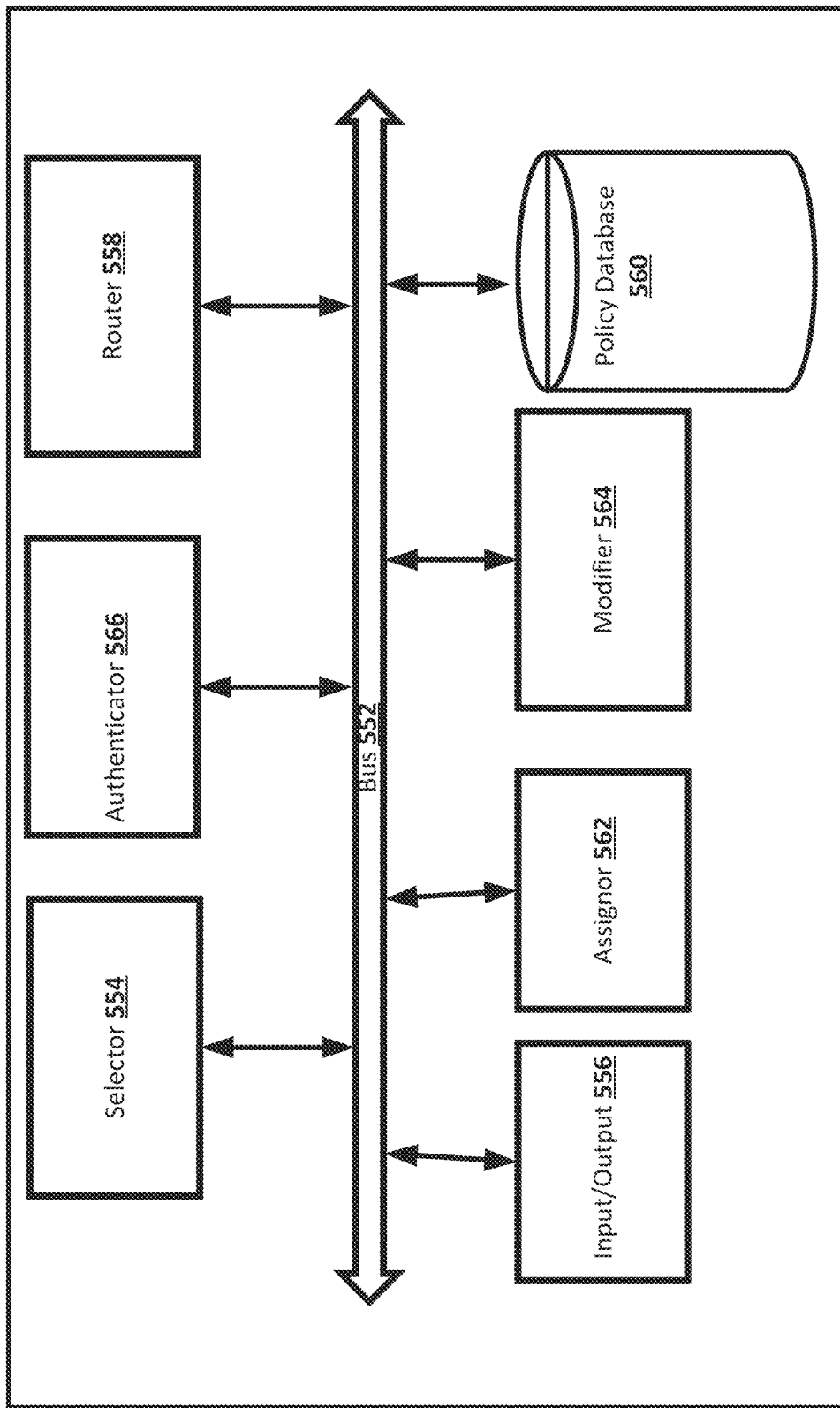
FIG. 6 schematically shows additional details of a system with the network routing filter of FIG. 5 and its interaction with its underlying device and/or network in illustrative embodiments of the invention.

Those skilled in the art may implement the filter 550 in a wide variety of manners. FIG. 6 schematically shows one such implementation. Each of the components of the implementation in FIG. 6 is operatively connected to other components by any conventional interconnect mechanism. FIG. 6 simply shows a bus 552 communicating each the components. Those skilled in the art should understand that this generalized representation can be modified to include other conventional direct or indirect connections. Accordingly, discussion of a bus is not intended to limit various embodiments.

Indeed, it should be noted that FIG. 6 only schematically shows each of these components. Those skilled in the art should understand that each of these components can be implemented in a variety of conventional manners, such as by using hardware, software, or a combination of hardware and software, across one or more other functional components. For example, the selector 554 (discussed below) may be implemented using a plurality of microprocessors executing firmware. As another example, a selector 554 (discussed in more detail below) may be implemented using one or more application specific integrated circuits (i.e., "ASICs") and related software, or a combination of ASICs, discrete electronic components (e.g., transistors), and microprocessors. Accordingly, the representation of the selector 554 and other components in a single box of FIG. 6 is for simplicity purposes only. In fact, in some embodiments, the selector 554 of FIG. 6 is distributed across a plurality of different machines—not necessarily within the same housing, chassis, or even geographic region.

It should be reiterated that the representation of FIG. 6 is a significantly simplified representation of an actual system for dynamically selecting routes based on device and/or user data. Those skilled in the art should understand that such a device has many other physical and functional components, such as central processing units, other packet processing modules, and short-term memory. Accordingly, this discussion is in no way intended to suggest that FIG. 6 represents all of the elements of the system shown.

As shown, the system of FIG. 6 has an input/output 556 for receiving and delivering packets from/to the network (e.g., the Internet or other Layer 3 network), a router 558 for routing packets across the network, and a policy database 560 containing routing information. As noted, that routing information relates specific routes across the network with users and/or devices. Specifically, the routing information may have a prescribed first set of routes for a User 1, a prescribed second set of routes for a User 2, etc. As another example, the routing information may have a prescribed first set of routes for a Device 1, a prescribed second set of routes for a Device 2, etc. Whether being prescribed/selected as a function of the device, user, or both, those routes may also relate to other information, such as the destination requested by the user.

The system also has the above referenced selector 554 configured to select routing information from the policy database 560, an assignor 562 configured to assign the selected routing information (e.g., specific routes) to a particular session, user, and/or device, and a modifier 564 configured to modify one or more packets of each session to implement the specified routes. For example, as discussed below, the modifier 564 may modify the first packet in a session without modifying the remaining packets. The system of FIG. 6 also may have an authenticator 566 configured to authenticate a device and/or user.

Figure 5:
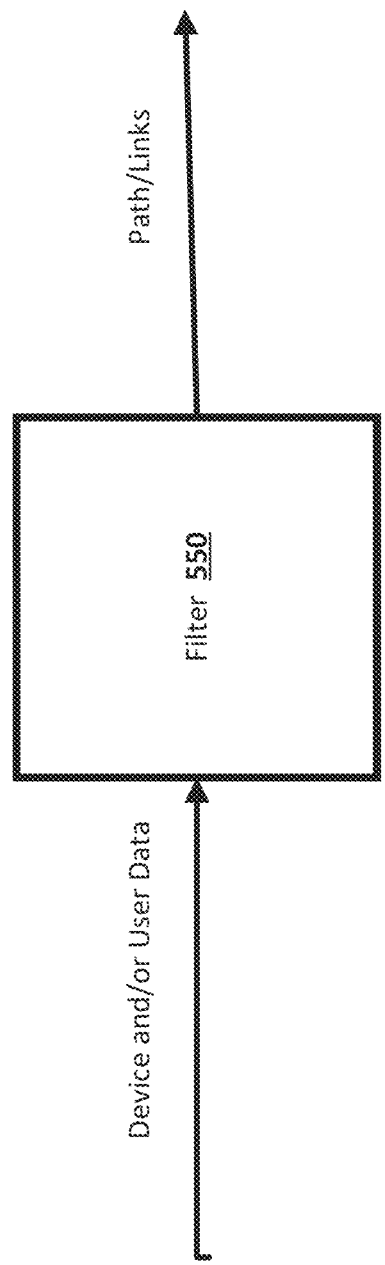
FIG. 5 schematically shows a network routing filter that may be configured in accordance with illustrative embodiments of the invention.

The filter 550 of FIG. 5 may have some or all of the noted components. For example, the filter 550 may have the policy database 560, input/output 556, selector 554, assignor 562, and modifier 564. The other components may be outside of the filter 550 and otherwise part of the system or network in which the filter 550 operates. Other embodiments may include the authenticator 566 and router 558 in the filter 550, or otherwise omit other elements. Those skilled in the art may select the appropriate components to achieve the core functionality of the filter 550, as well as any additional functionality.

Figure 7A:
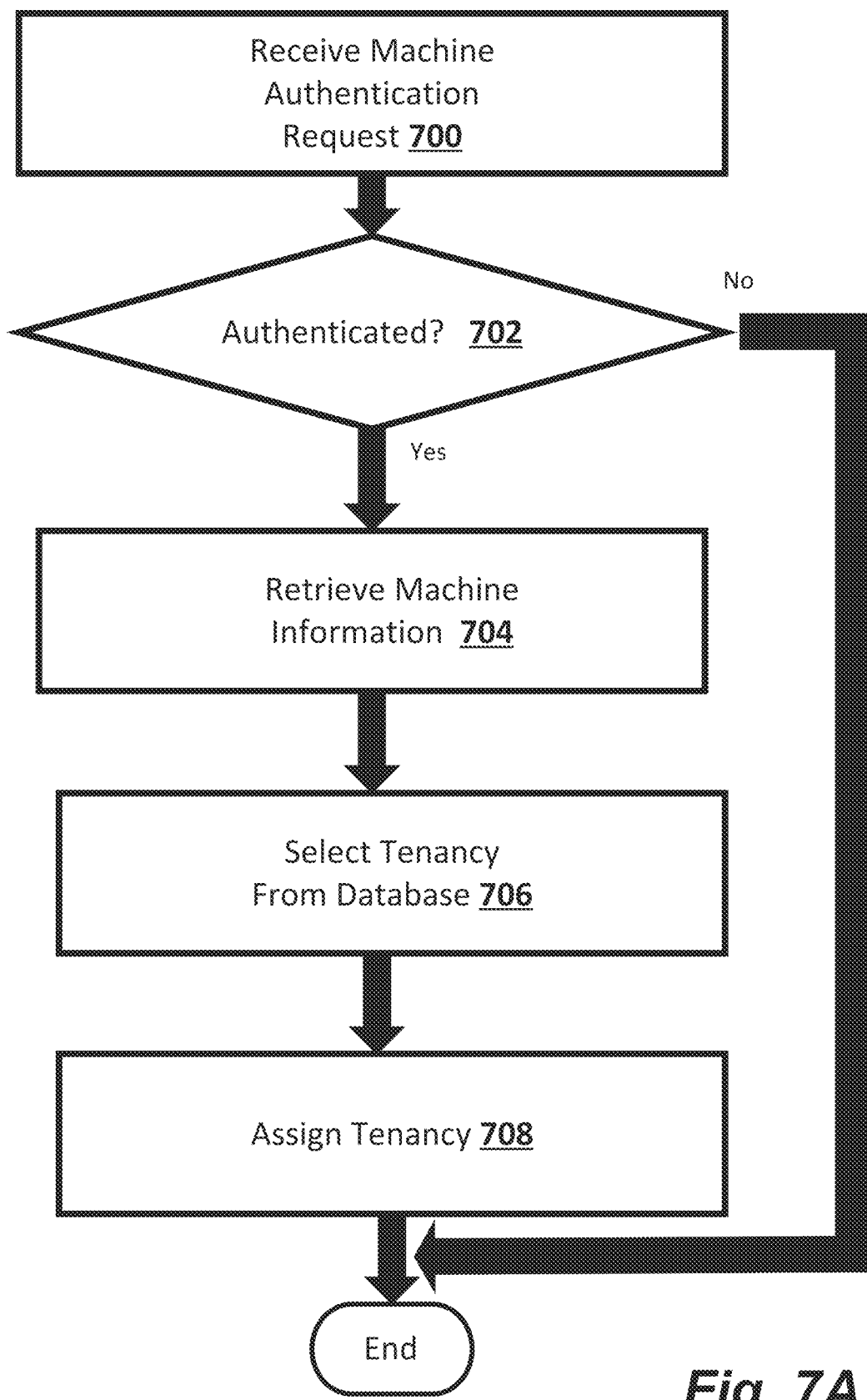
FIG. 7A schematically shows a process of machine/device-based routing in accordance with illustrative embodiments of the invention.

FIG. 7A shows more details of controlling or assigning routes to a network device in accordance with illustrative embodiments of the invention. It should be noted that this process is substantially simplified from a longer process that normally would be used to assign device routes. Accordingly, the process typically has many steps that those skilled in the art likely would use. In addition, some of the steps may be performed in a different order than that shown, or at the same time. Those skilled in the art therefore can modify the process as appropriate. Moreover, as noted above and below, many of the devices and structures noted are but one of a wide variety of different devices and structures that may be used. Those skilled in the art can select the appropriate devices and structures depending upon the application and other constraints. Accordingly, discussion of specific devices and structures is not intended to limit all embodiments.

The process of FIG. 7A begins at step 700, in which the authenticator 566 receives a machine authentication request via the input/output 556. Specifically, the machine requests access to the network, and the network uses its intelligence to determine if the machine can obtain access. For example, when a Windows desktop machine attempts to join a network (an "active directory"), a computer account is created in the active directory and a unique password is negotiated between the desktop machine and the active directory. Protocols currently in use include Kerberos, Extensive Authentication Protocol, Server Message Block, and Netbios. While these protocols are enabled, other protocols and destinations can be blocked until the machine successfully authenticates.

During authentication, Kerberos, for example, may be used for the actual authentication, with a Kerberos ticket being issued for the machine. After this ticket is issued, machine specific policies may be applied to the machine as part of the "Active Directory Join" action.

Thus, the process determines at step 702 if the device/machine is authenticated to access the network at all. This is a "go" (i.e., the machine may proceed to the next step) or "no-go" (the machine cannot access the network) decision. If the device cannot be authenticated, then the process skips the remaining steps and ends. Conversely, if the device is authenticated, then the process continues to step 704, which retrieves machine information. Among other things, that machine information may include:

Type of machine (e.g., a computer, scanner, Internet appliance, router, etc.),
Machine manufacturer information (e.g., name, location of company),
Serial number of machine,
Geographic location of the machine,
Software versions and patch levels,
Certificates,
Owner of the machine At some time after receiving the authentication request, information relating to the machine is made available to the filter 550 and its relevant components. That information may be determined in any of a variety of manners, such as from the authentication request itself, or machine information the filter receives in some other way after step 700 receives the authentication request. For example, the selector 554 may simply receive information relating to the machine and that received information may have been provided by some other device/component. Alternatively, the selector 554 may receive information about the authentication request and access the machine information itself from some other component, database, or other source. Those skilled in the art may select an appropriate manner for receiving the machine information.

As such, at step 706, the selector 554 may access the policy database 560 using the information relating to the machine to determine the "tenancy" of the machine. For example, the selector 554 may access the policy database 560 using some or all of the machine information noted above (or other, different machine information). This policy database 560 provides the routing information required from a plurality of routes, which themselves may be stored with a plurality of other routing policies. Illustrative embodiments refer to "group routing policies", which are policies defining how groups of machines/devices and/or groups of users are grouped for specific routing (based on their specific attributes, discussed above and below). As an example, an unsecured PC may be assigned to a group routing policy for low security devices, and that group routing policy may take a prescribed set of routes. Indeed, such unsecured PC likely will not be assigned to a group routing policy for secure PCs. These group routing policies preferably are stored in the policy database 560 (or other database) and contain a plurality of different group routing policies.

While discussed generally as having routes, the routing policies also may have other routing parameters for the given device. For example, the routing policies may also include bandwidth allocation, bandwidth priority, and quality of service definitions, among other things. Accordingly, in some embodiments, a selected route or set of routes may be used with certain parameters (e.g., bandwidth allocation). In some embodiments, this may be the case for the methods of FIG. 7A and/or FIG. 7B (routing policy based on the user, discussed below).

Those skilled in the art may configure the database in a wide variety of manners, such as by using a look up table and/or a series of Boolean expressions to assign routes. For example, the database may include the following Boolean Table:

| Boolean Table | |
|---|---|
| Boolean Expression | Available Route(s) |
| Feature 1 AND Feature 2 AND Feature 3 | Route 1 |
| Feature 1 OR Feature 2 | Route 1, Route 2 |
| Feature 4 only | All available Routes |
| (Feature 1 AND Feature 2) OR Feature 3 | Route 16 |
| AND of all Features | Route 2, Route 4, Route 5 |
| Feature 3 AND Feature 6 | No Routes |

Accordingly, with knowledge of the machine information (i.e., Features), the selector 554 may process the various Boolean expressions in the database to determine the appropriate tenancy of the machine. In illustrative embodiments, the set of routes assigned to a machine (or user, discussed below) may be referred to as a "tenancy;" i.e., the tenancy represents the set of zero or more routes available to a given machine (or user). For example, using the exemplary Boolean table above, the selector 554 may determine that the machine has Feature 1 only and thus, Routes 1 and 2 are the tenancy of the machine.

Next, the assignor 562 assigns the tenancy to the machine (step 708). Accordingly, that machine now can access the network, but is limited to the specific routes in its tenancy. At this point, the machine can use no routes to access the network other than those assigned to its tenancy. Accordingly, while not being a "go" or "no-go" decision, this step can significantly limit or constrain the universe of available routes available to the machine. Alternative embodiments may permit additional routes as an added layer of flexibility. Yet other embodiments may then prevent certain of the routes in the machine's tenancy due to various factors, such as one of the routes being down/broken.

In some embodiments, this process is executed within a local area network (e.g., by a device in the source network 450 of FIG. 4). In other embodiments, this process may be executed on another node, such as an intermediate node (e.g., one or more of routers R1-R5). Moreover, authentication processes may be skipped in some embodiments, such as when the process is performed on an intermediate router. The process of FIG. 7B, discussed below, also may execute its process in a similar manner (e.g., omitting authentication and/or on a local node or intermediate node).

Figure 7B:
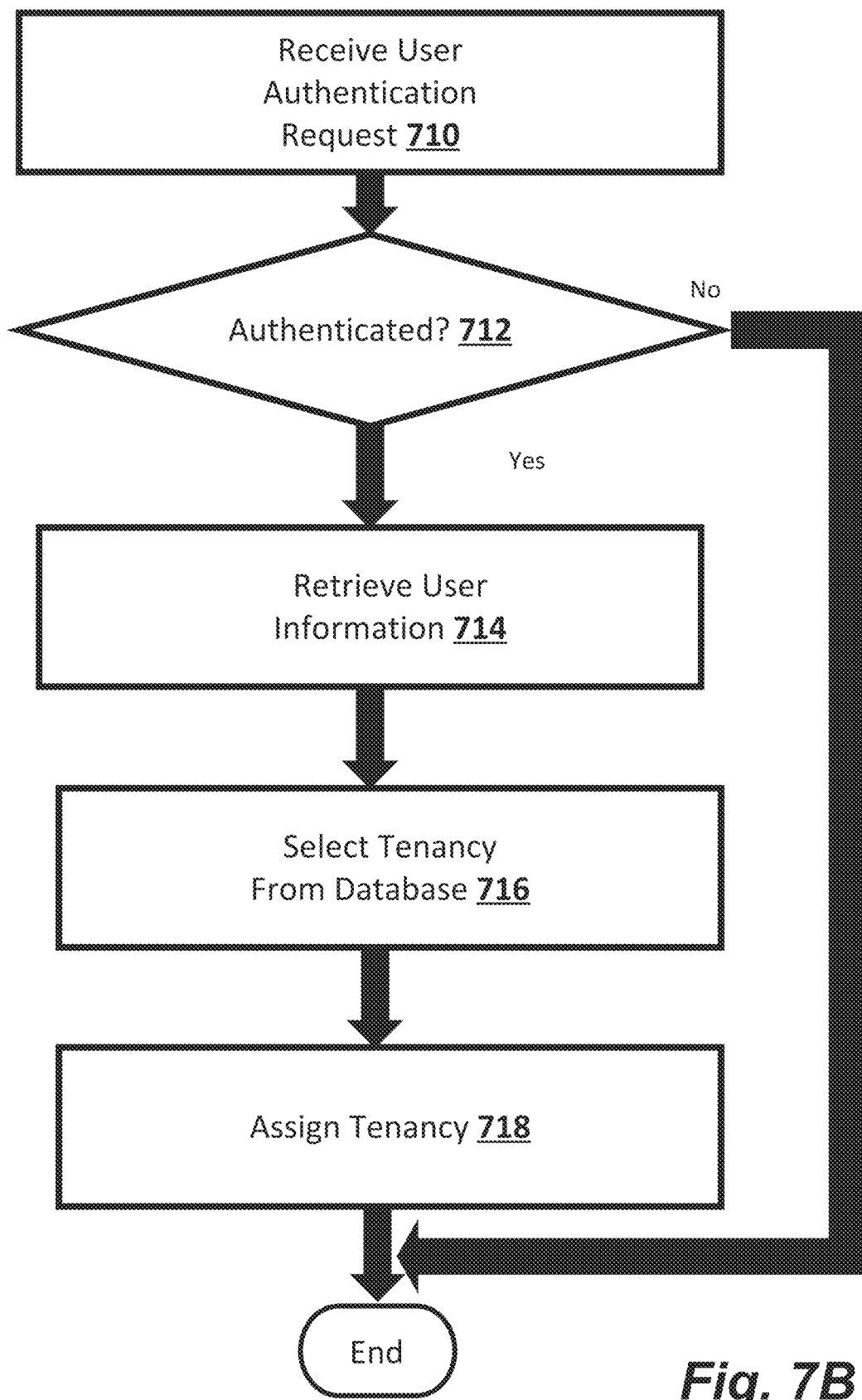
FIG. 7B schematically shows a process of user-based routing in accordance with illustrative embodiments of the invention.

In addition or alternatively, illustrative embodiments may apply a tenancy on a user basis, which is described in FIG. 7B. This process is similar to the process in FIG. 7A and thus, those skilled in the art may apply techniques and principles discussed with regard to FIG. 7A to the process of FIG. 7B. Also in a manner similar to FIG. 7A, it should be noted that this process is substantially simplified from a longer process that normally would be used to assign routes. Accordingly, the process typically has many steps that those skilled in the art likely would use. In addition, some of the steps may be performed in a different order than that shown, or at the same time. Those skilled in the art therefore can modify the process as appropriate. Moreover, as noted above and below, many of the devices and structures noted are but one of a wide variety of different devices and structures that may be used. Those skilled in the art can select the appropriate devices and structures depending upon the application and other constraints. Accordingly, discussion of specific devices and structures is not intended to limit all embodiments.

The process of FIG. 7B begins at step 710, which receives a user authentication request for the user to access the network. This request may originate from a user interface, such as a graphical user interface. FIG. 8 schematically shows an exemplary graphical user interface 568 that may be used for this purpose. Generic shapes are shown to denote various buttons, dropdown menus, and other known access points for a graphical user interface. Indeed, those skilled in the art may use other interfaces (e.g., other types of graphical user interfaces or voice interfaces) and thus, those skilled in the art can select the interface as deemed appropriate for the application.

As with the machine authentication noted above, the user requests access to the network and the network uses its intelligence to determine if the user can obtain access. For example, the authenticator 566 may authenticate a user either locally (e.g., home users) or by the active director (e.g., for business users). After successful authentication in the Windows context, a session identifier that can be used to determine identity in user space will become available. Note that it is possible that more than one user will be logged in at the same time. The operating system thus may keep track of which user is using the network at any given time by setting the session identifier in the context.

Those skilled in the art may start this process using similar and/or other techniques to those discussed above with regard to FIG. 7A. For example, an authentication event (user sign-on, user sign-off, etc.) to a network may invoke a transaction to determine the user's tenancy. Other embodiments may trigger appropriate processes in other ways, including chaining onto existing authentication processes, and/or noticing a lack of information upon use of the network.

Step 712 then determines if the user is authenticated—if the user can access the network at all. In a manner similar to the corresponding machine authentication step 702, this is a "go" or "no-go" decision. If the user cannot be authenticated, then the process skips the remaining steps and ends. Conversely, if the user is authenticated, then the process continues to step 714, which retrieves (or receives) user information in a variety of manners, such as those discussed above with regard to FIG. 7A (or other ways). Among other things, that may include the following user/client information:

name
organizational unit
group
certificates
employment status
role in the organization
hair color
accessibility level (e.g., top secret, secret, confidential, etc.)

With this user information, at some time after receiving the authentication request, information relating to the user is made available to the filter 550 and its relevant components. That information may be determined in a manner similar to how the machine information was determined in FIG. 7A. For example, that information may be determined from the authentication request itself, or secondary information retrieved using the authentication request (e.g., if the filter 550 did not receive the authentication request itself). For example, the selector 554 may simply receive information relating to the user and that received information may have been provided by some other device/component. Alternatively, the selector 554 may receive information about the authentication request and access the user information itself from some other component, database, or other source.

As such, at step 716, the selector 554 may access the policy database 560 using the information relating to the machine to determine the "tenancy" of the user. For example, the selector 554 may access the policy database 560 using some or all of the user information noted above (or other, different machine information). As with the machine routing method above, those skilled in the art may configure the database in a wide variety of manners, such as by using a look up table and/or a series of Boolean expressions to assign routes. Also in a manner similar to the machine routing method of FIG. 7A, the selector 554 may access any of a variety of data structures (e.g., the above Boolean Table) within the policy database 560 to determine the tenancy of the user.

For example, using the exemplary Boolean table above, the selector 554 may determine that the user has Feature 1 only and thus, Routes 1 and 2 are the tenancy of the user. This tenancy therefore is used to route packets for this user. In some embodiments, the selector 554 may use the session identifier to lookup the tenant in the policy database 560. In this example, the tenant of the user may be represented by a text string assigned to the specific authenticated user through any one of the following techniques:

1.) It is explicitly defined by extending the administrative domain data model

2.) It is assumed to be the administrative domain organizational unit

3.) It is assume to be the administrative domain group policy name

It should be noted that the tenant string preferably does not change within the context of a logged-in user. Accordingly, the tenant string may be stored for future use.

Next, in a manner similar to step 708, the assignor 562 assigns the tenancy to the user, effectively assigning a group user policy (step 718). Accordingly, that user now can access the network, but is limited to the specific routes in his/her tenancy. At this point, the user can use no routes to access the network other than those assigned to its tenancy. Alternative embodiments may permit additional routes as an added layer of flexibility. Yet other embodiments may then prevent certain of the routes in the user's tenancy due to various factors, such as one of the routes being down/broken.

As noted above, the specific routes assigned to the user and/or machine may be a function of one or both the user and machine. In either case, illustrative embodiments alter at least one packet of a session (e.g., the lead packet) to act as a flag to network devices receiving the packet stream/session that this particular stream is limited to certain routes. Accordingly, some downstream network devices (e.g., stateful routing devices discussed below) cooperate to ensure that a given session remains on the specified routes.

As known by those in the art, the router 558 forwards the packets of a session via the specified link-layer route(s). In illustrative embodiments, when transmitting packets to a default gateway (i.e., as opposed to directly on the LAN), the modifier 564 receives and inserts tenant information into the lead packet. For example, when used with a TCP session, this lead packet will be the well-known SYN packet. After it is modified, the router 558 transmits the modified first packet, and then simply permits the rest of the session to continue without further packet modification. The inserted tenant information communicates to the first router encountered that the routes available are associated with the tenant defined.

In illustrative embodiments, this signals two pieces of information to the routed network:

1) The user has properly authenticated and has been joined to the network, and

2) The routes that are available to this specific defined tenant are known.

More specifically, in some embodiments, a kernel level driver installs a callback when an outbound socket is opened to capture/suspend the first packet before it is sent. This includes various types of sockets, including TCP and UDP sockets. The callback function effectively suspends the first packet from being delivered. To that end, in the Kernel Driver, certain processes may:

1. Determine if the packet is going to the default gateway. If so, the destination address may be considered to be "outside" the default netmask. If the packet is not going to the default gateway, however, then the system may un-suspend the packet to let the flow continue.

2. If STEP 1 above results in the destination IP Address being outside the default netmask, then the packet may be modified by inserting metadata at the "end of the current payload." SYN packets, for example, have no payload and thus, the metadata will be the entire payload. For UDP packets, the metadata can be added at the end of the current payload.

3. The filter 550 may update packet lengths in the correct places for TCP and UDP.

4. The modified packet is transmitted, and the rest of the packets associated with the session are allowed to complete with no changes.

Note that alternative embodiments may format more than one packet, or one packet that is not necessarily the lead packet.

Those skilled in the art can format the tenant specific metadata in the first packet in any of a variety of manners. For example, the tenant information may be inserted into the end of the first packet with the following format (below). For TCP packets, this may be the byte that follows the L4 header. For UDP packets, this may be the byte that is in location PACKET-LENGTH+1.

Figure 19:
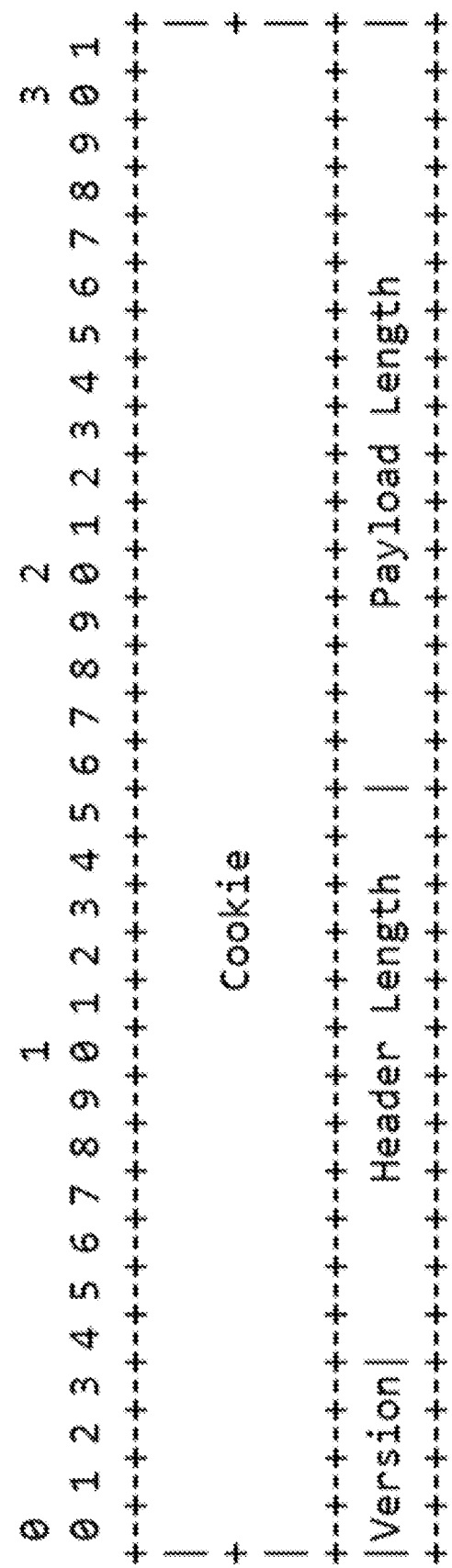
FIG. 19 depicts an exemplary format of a metadata header in accordance with the techniques of the disclosure.

FIG. 19 depicts an exemplary format of the metadata header, which may be the base structure upon which session and packet attributes are built.

The various fields in the example of FIG. 19 include:

Cookie (8 bytes): The fingerprint of metadata. This value along with the context of participating in a fabric (inter-node, inter-router, etc.) may be used to determine the existence of metadata on a packet. A well-known "cookie" (e.g., 0x4c48dbc6ddf6670c in network byte order or 0x0c67f6ddc6db484c in host byte order) is built into the header, which is used in concert with contextual awareness of the packet itself to determine the presence of metadata within the packet.

Version (4 bits): This field represents the version of the metadata header.

Header Length (12 bits): This field represents the length of the metadata header, including added optional attributes that are guaranteed to be unencrypted. This value is equal to the total payload length–data that follows the header length value.

Payload Length (2 bytes): This field represents the length of data following the metadata header, not including the size of the header.

The exemplary metadata header of FIG. 19 may be followed/appended by the tenant information in the form of an alphanumeric string—i.e., indicating the tenancy to which the session and/or machine belongs. This string, which preferably is unencrypted (although encryption may be required in some implementations, such as in certain virtual private networks) may be formatted 15 as depicted in the example of FIG. 20.

The various fields in the example of FIG. 20 include:

Type (2 bytes): This field identifies the Tenant information

Length (2 bytes): This field identifies the number of bytes associated with the length of the value (not including the four bytes associated with the type and length fields).

Name (variable length bytes): This field represents the tenant name as an array of Length characters.

As noted above, preferred embodiments implement the processes of FIGS. 7A and 7B, as well as the processes of intercepting/modifying the lead packet and redirecting the session flow, in a manner that is not perceptible to a typical user. For example, while using the graphical user interface 568 of FIG. 8, the user will perceive no noticeable changes to the interface, such as additional indicia suggesting the change. Instead, in preferred embodiments, the indicia and interaction of the interface proceeds in the same manner as if these processes were not occurring.

Figure 9A:
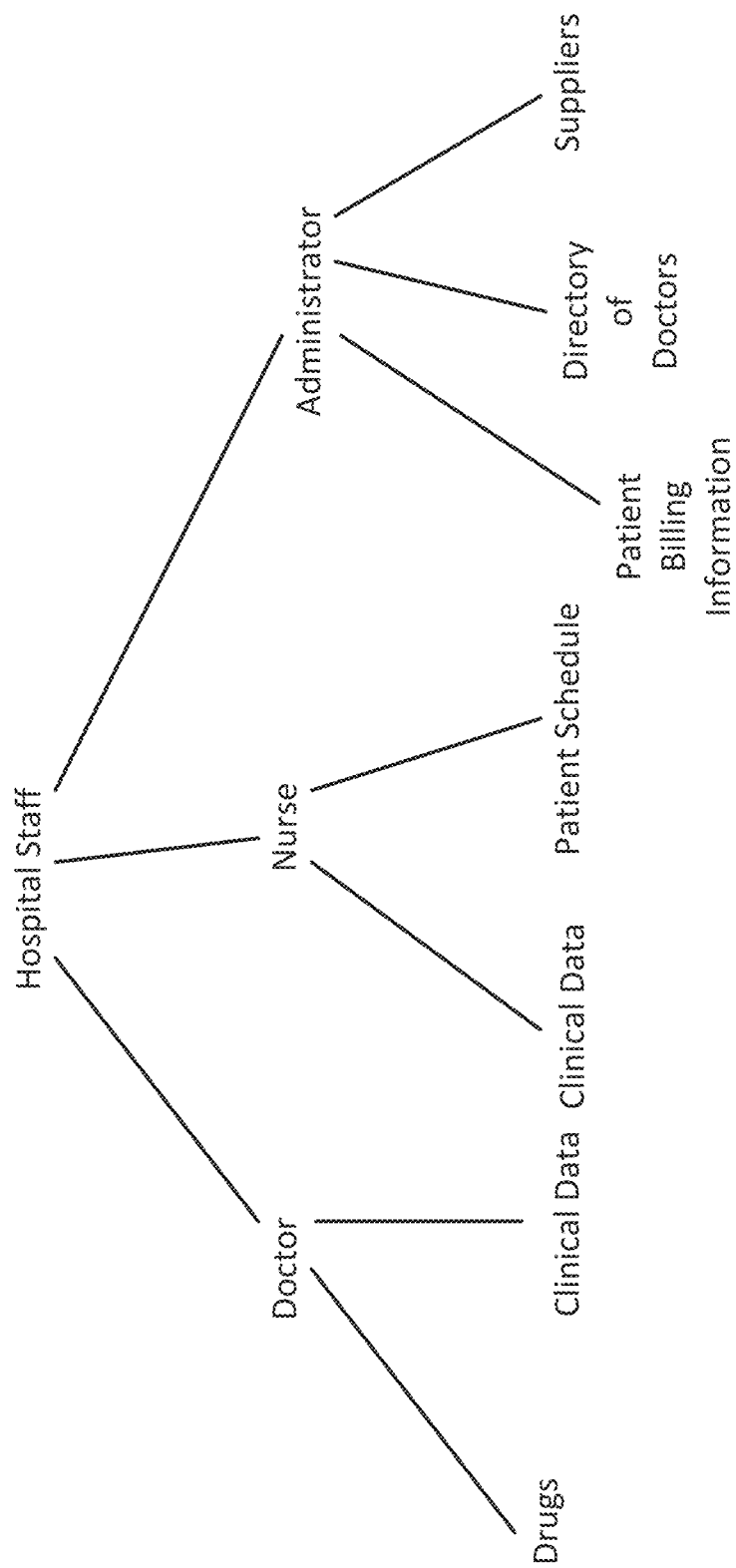
FIG. 9A schematically shows a user tree-structure configured in accordance with illustrative embodiments of the invention.
Figure 9B:
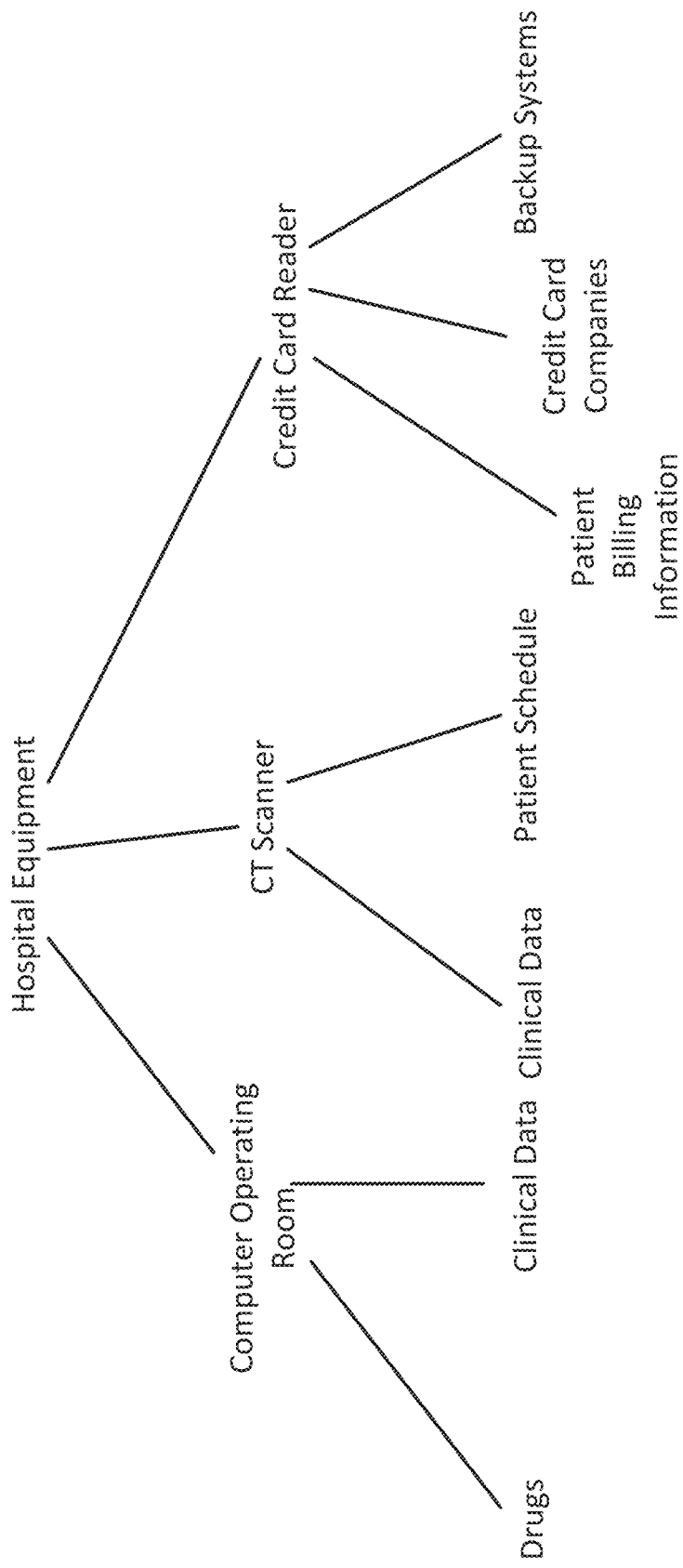
FIG. 9B schematically shows a machine/device tree structure configured in accordance with illustrative embodiments of the invention.

FIGS. 9A and 9B schematically show two simplified exemplary tree structures of users and machines—FIG. 9A shows a tree structure for a user tenancy in a hospital environment, while FIG. 9B shows a tree structure for a machine in a hospital environment.

For example, FIG. 9A denotes different hospital staff and the data files to which they have access. In this case, a doctor has access to files on a server or databases relating to drugs and clinical data, while a nurse has access to clinical data and patient schedules. An administrator has access to files of patient billing information, directories of doctors, and suppliers. Accordingly, routes may be assigned to a tenancy as a function of the different users' access levels. A doctor, for example, may be routed along a link having logic that keeps track of his/her access to the sensitive opioid drug databases. All accesses to the opioid database thus may be more carefully monitored and tracked. As another example, a hacker may raise suspicion and login as a doctor (e.g., when the system knows the doctor is on vacation or from a remote geography), and the link may lead the hacker to a honeypot to determine if it is, in fact, the doctor. FIG. 9B can have corresponding functionality the machine context.

Figure 9C:
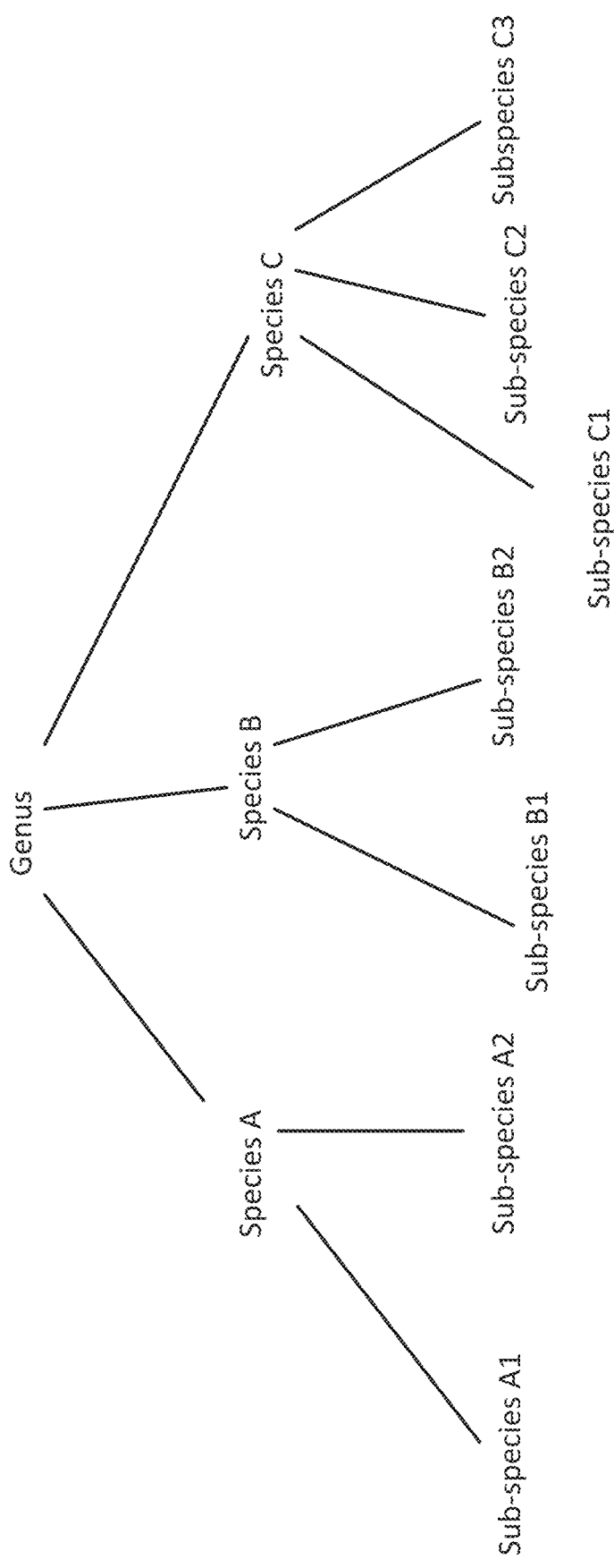
FIG. 9C schematically shows a hierarchical data routing structure that may be used in illustrative embodiments of the invention.

Those skilled in the art may implement the policy database 560 and their attendant tenancies in any of a variety of manners. For example, the tenancies can be flat, or take on the form of a hierarchy. FIG. 9C schematically shows a generic hierarchical format that can be used for either or both user and machine based routing. It should be noted that this is a significantly simplified representation of a hierarchy and used merely to easily show the concept. This tree has three levels: Genus, Species, and Sub-species levels.

The users or machines at a given sub-species have access to the same routes as those to which they are connected in their immediately preceding level. For example, users of Sub-species A1 and A2 both have access to the same routes as those assigned to Species A. Those two sub-species, however, also may have additional sets of routes (or specific route restrictions) that differ from each other. Sub-species A1 and A2 further do not necessarily have the routes specified for Species B or Species C (to the extent they are different than those available to Sub-species A1 and A2 up the tree). As another example, all sub-species share the same routes as Genus.

This routing scheme has a variety of benefits. Among others, this technique provides different routing tables and policies based on the user and/or the machine. Prior art known to the inventors only premits associating one user on one policy with one source IP address. Accordingly, if a prior art machine is shared by two users, the routing policies undesirably also are shared. To the contrary, illustrative embodiments favorably permit two or more entities (machines and/or users) to use one IP address, and each entity will have behavior that is unique to the entity. For example, shared computers with one high priority user and one medium priority user can both share one IP address and yet, have the ability to route based on multiple different sets of policies. Moreover, as Layer 3 processes, illustrative embodiments solve problems of Application Layer processes.

Stateful Routing

As discussed above, in some embodiments, the stream of packets forwarded between the source network 450 and the destination network 452 are part of a session that follows the same path as the lead packet of that session, at least in the forward direction, i.e., from a source client to a destination service. The subsequent packets traverse at least a subset of the routers the lead packet traverses between the source client and the destination service. Among other benefits, this stateful routing scheme more effectively enhances the benefits of collecting routing statistics and/or invisibly directing suspicious users to prescribed devices to check their intentions, credentials, etc. Those skilled in the art may implement such a stateful routing scheme with the configuration functionality described above.

Each router in the subset is referred to herein as an intermediate node or waypoint, although the waypoints are not necessarily predetermined before the lead packet is sent by the source client. The lead packet may be naturally routed, or routed by a pre-specified path. It should be noted that although the discussion below describes use of natural routing, it should not limit various embodiments to such a scheme. If the path is not pre-specified, then the path taken by the lead packet establishes the waypoints. In either case, the subsequent packets traverse the same waypoints, and in the same order, as the lead packet.

Of course, some packets may be dropped along the way, as is typical in an IP network or internet, such as by an overloaded router or due to corruption of the packet by a link. Thus, all the packets sent by the source client need not reach the session's destination service and, consequently, all the packets sent by the source client need not traverse all the waypoints. However, subsequent packets that do reach the destination service must traverse all the waypoints in its path. For simplicity of explanation, dropped packets are ignored in the remaining discussion, and the term "all the packets" means all the packets that reach their respective destinations.

As a result of this forward flow control, metrics collected at one of the waypoints represent all the packets of the session. These metrics are not diluted by packets that bypass the waypoint, because no packet of the session can bypass any waypoint. Security functions, such as inspection for malicious packets, performed at one waypoint are sure to be performed on all packets of the session. Importantly, this enables statistics to be calculated for specific sessions.

Some embodiments also ensure that return packets from the destination service to the source client also follow the same path, i.e., traverse the waypoints, but in reverse order. This reverse flow control enables use of paths, such as via proprietary networks, that might not otherwise be available by naturally routing the return packets.

Figure 10:
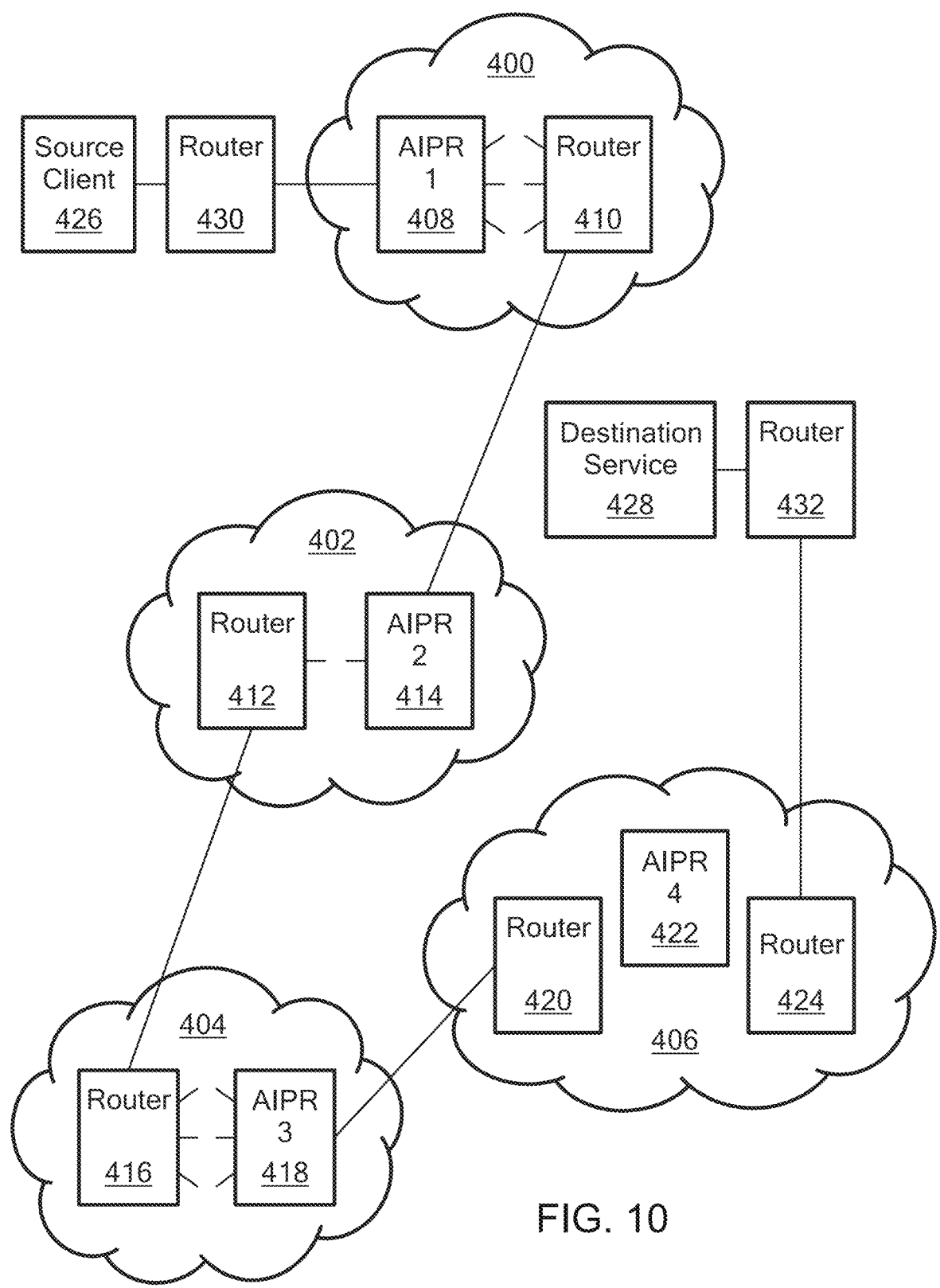
FIG. 10 schematically shows a hypothetical internet that includes a conventional routers and augmented IP routers (AIPRs), according to an embodiment of the present invention.

A packet flow controller (also referred to herein as an augmented IP router ("AIPR")) ensures that subsequent packets of a session follow the same path as the lead packet of the session, as discussed above. In fact, one or both of the routers RS and RD, and/or routers R1-R5 of FIG. 4 may be implemented as AIPRs/waypoints. An AIPR also performs conventional routing functions, and also those described above with regard to statistics collection. FIG. 10 shows a schematic diagram illustrating a hypothetical set of interconnected networks 400, 402, 404 and 406, i.e., an internet. Each network 400, 402, 204, 406 includes a number of routers and AIPRs, not all of which are necessarily shown. Network 400 includes AIPR1 408 and router 410. Network 400 may be, for example, a network of a telecommunications carrier or a regional/global hospital system (e.g., Partners Healthcare of Boston, Mass.). Network 402 includes a router 412 and AIPR 2 414. Network 402 may be, for example, a network of a first ISP. Network 404 includes a router 416 and AIPR 3 418. Network 404 may be, for example, the Internet backbone or a portion thereof. Network 406 includes a router 420, AIPR 4 422 and another router 424. Network 406 may be, for example, a network of a second ISP.

Assume a source client node 426 initiates a session with a destination service node 428. For example, the source client 426 may request access to a database or content from a web page, and the destination service node 428 may include a web server. The source client 426 may, for example, be part of a first local area network (LAN) (not shown) within a first corporation, and the LAN may be connected to the telecommunications carrier network 400 via a gateway router 430 operated by the corporation. Similarly, the destination service node 428 may be operated by a second corporation, and it may be part of a second LAN (not shown) coupled to the network 406 of the second ISP via a gateway router 432 operated by the second corporation. As a lead packet of the session traverses the internet, each AIPR (waypoint) the packet traverses records information that eventually enables the waypoint to be able to identify its immediately previous waypoint and its immediately next waypoint, with respect to the session.

The lead packet of the session is naturally routed. Assume the lead packet reaches AIPR 1 408 before it reaches network 402, 404 or 406. AIPR 1 408 automatically identifies the lead packet as being an initial packet of the session. AIPR 1 408 may use various techniques to identify the beginning of a session, as noted above and as discussed in more detail below. AIPR 1 408 becomes the first waypoint along a path the lead packet eventually follows.

AIPR 1 408 assigns a unique identifier to the session and stores information about the session in the AIPR's database to enable the AIPR 1 408 to identify subsequent packets of the session. In some embodiments, AIPR 1 408 reads the client socket/service socket number pair in the lead packet and stores the client socket/service socket number pair in a database to uniquely identify the session. This enables the AIPR 1 408 to identify the subsequent packets as being part of the session, because all subsequent packets of the session will contain the same client socket/service socket number pair.

In some embodiments, AIPR 1 408 sets a flag in its database to indicate the lead packet has not traversed any other AIPR before reaching AIPR 1 408. This flag may be used later, for example when the AIPR 1 408 handles return packets. AIPR 1 408 may be able to identify the lead packet as not having traversed any other AIPR by lack of any modification to the packet. Packet modification is described below.

AIPR 1 408 modifies the lead packet to indicate the lead packet has been handled by an AIPR. In some embodiments, the AIPR 1 408 stores the unique identifier of the session and, if not included in the unique identifier, the AIPR's network address in the packet to produce a modified lead packet. Subsequent AIPRs, if any, that handle the (now modified) lead packet use this modification to identify the lead packet as a lead packet that has been handled by an AIPR, and to indicate that subsequent packets of the session should be routed the same way as the lead packet is routed.

In some embodiments, AIPR 1 408 assigns a port number on the interface over which AIPR 1 408 will forward the lead packet. The AIPR's network address and this port number, in combination, may be used as a unique identifier of the session, at least from the point of view of the next AIPR along the path. AIPR 1 408 may include the AIPR's network address-port number combination in the modified lead packet. Thus, the next AIPR along the path may assume that subsequent packets sent from this network address-port number combination are part of, or likely to be part of, the session.

AIPR 1 408 then forwards the lead packet naturally. The lead packet traverses an unspecified number of nodes of network 400 until it reaches router 410, which naturally routes the lead packet to network 402. Assume the router 410 forwards the lead packet to AIPR 2 414 in network 402.

AIPR 2 414 detects the modification to the lead packet, identifying a need for special treatment. AIPR 2 414 becomes the second waypoint along the path the lead packet will follow. AIPR 2 414 stores in its database the network address of AIPR 1 408 and the port number assigned by AIPR 1 408, in association with a unique identifier of the session, such as the client and server socket number pair, thus identifying the previous waypoint along the path in association with the session. In this way, each waypoint learns the network address and port number of the previous waypoint along this session's path and uses a related association device (an "associator") to associate this information with a session identifier. This information may be used later to forward return packets, from waypoint to waypoint, back to the source client 426.

In some embodiments, AIPR 2 414 assigns a port number on the interface over which the lead packet was received. The AIPR's network address and this port number, in combination, may be used as a unique identifier of the session, at least from the point of view of AIPR 1 408. Thus, subsequent packets addressed to this network address-port number combination may be assumed to be, or at least are likely to be, part of the session.

In some embodiments, AIPR 2 414 sends a packet back to AIPR 1 408 to inform AIPR 1 408 of the network address-port number combination, in association with the identification of the session. In some embodiments, the network address-port number combination are sent to AIPR 1 408 later, in connection with a return packet, as described below. In either case, AIPR 1 408 learns a network address-port number combination unique to the session, and AIPR 1 408 sends subsequent packets to that address-port combination, rather than naturally forwarding the subsequent packets. In this way, each waypoint learns the network address and port number of the next waypoint along this session's path. This information is used to forward subsequent packets, from waypoint to waypoint, forward to the destination service 428, along the same path as the lead packet.

AIPR 2 214 modifies the lead packet to include the network address of AIPR 2 214, and then forwards the lead packet naturally. As with AIPR 1 408, in some embodiments AIPR 2 214 assigns a port number on the interface over which AIPR 2 214 forwards the packet, and the network address of AIPR 2 214 and the port number are included in the modified lead packet AIPR 2 214 sends.

The lead packet traverses an unspecified number of nodes of network 402, until it reaches router 412, which naturally routes the lead packet to network 404. Assume the router 416 forwards the lead packet to AIPR 3 418.

AIPR 3 418 becomes the third waypoint along the path the lead packet will follow. AIPR 3 418 operates much as AIPR 2 414. The lead packet is then forwarded to network 406, where it traverses AIPR 4 422, which becomes the fourth waypoint.

Three scenarios are possible with respect to the last AIPR 422 (AIPR 4) along the path to the destination service 428.

In the first scenario, one or more AIPRs relatively close to a destination service are provisioned to handle lead packets for the destination service. The AIPRs may be so provisioned by storing information in their databases to identify the destination service, such as by the service socket number or other unique identifier of the service. These "terminus" AIPRs broadcast their ability to forward packets to the destination service. A terminus AIPR is an AIPR that can forward packets to a destination service, without the packets traversing another AIPR. A terminus AIPR recognizes a lead packet destined to a service that terminates at the AIPR by comparing the destination service socket number to the information provisioned in the AIPR's database.

If AIPR 4 422 has been so provisioned, AIPR 4 422 may restore the lead packet to its original form, i.e., the form the lead packet had when the source client 426 sent the lead packet, or as the packet might have been modified by the router 430, such as a result of network address translation (NAT) performed by the router 430. Thus, the lead packet may be restored to a form that does not include any of the modifications made by the waypoints 408, 414 and 418. AIPR 4 422 then forwards the lead packet to the destination service 428. Like AIPR 3 418, AIPR 4 422 stores information in its database identifying AIPR 3 418 as the previous AIPR for this session.

In the second scenario, AIPR 4 422 is not provisioned with information about the destination service 428. In such embodiments, AIPR 4 422 may operate much as AIPR 2 414 and AIPR 3 418 operate. AIPR 4 422 modifies and naturally forwards the lead packet, and the lead packet is eventually delivered to the destination service 428. The destination service 428 responds to the lead packet. For example, if the lead packet is a SYN packet to initiate a TCP session, the destination service 428 responds with an ACK or SYN/ACK packet. AIPR 4 422 recognizes the return packet as being part of the session, such as based on the source client/destination service network address/port number pairs in the return packet. Furthermore, because the return packet was sent by the destination service 428, and not another AIPR, AIPR 4 422 recognizes that it is the last AIPR along the path for this service.

AIPR 4 422 stores information in its database indicating AIPR 4 422 is a terminus AIPR. If AIPR 4 422 receives subsequent packets of the session, AIPR 4 422 may restore the subsequent packets to their original forms, i.e., the forms the subsequent packets had when the source client 426 sent the subsequent packets, or as the packets might have been modified by the router 430, such as a result of network address translation (NAT) performed by the router 430. AIPR 4 422 forwards the subsequent packets to the destination service 428.

AIPR 4 422 modifies the return packet to include a port number on the interface AIPR 4 422 received the lead packet from AIPR 3 418, as well as the network address of AIPR 4 422. AIPR 4 422, then forwards the return packet to AIPR 3 418. Although the return packet may be forwarded by other routers, AIPR 4 422 specifically addresses the return packet to AIPR 3 418. This begins the return packet's journey back along the path the lead packet traveled, through all the waypoints traversed by the lead packet, in reverse order. Thus, the return packet is not naturally routed back to the source client 426.

AIPR 3 418 receives the modified return packet and, because the return packet was addressed to the port number AIPR 3 418 previously assigned and associated with this session, AIPR 3 418 can assume the return packet is part of, or likely part of, the session. AIPR 3 418 copies the network address and port number of AIPR 4 422 from the return packet into the AIPR's database as the next waypoint for this session. If AIPR 3 418 receives subsequent packets of the session, AIPR 3 418 forwards them to the network address and port number of the next waypoint, i.e., AIPR 4 422.

Thus, once an AIPR is notified of a network address and port number of a next AIPR along a session path, the AIPR forwards subsequent packets to the next AIPR, rather than naturally routing the subsequent packets.

AIPR 3 418 forwards the return packet to AIPR 2 414, whose network address and port number were stored in the database of AIPR 3 418 and identified as the previous waypoint of the session. Likewise, each of the waypoints along the path back to the source client 426 forwards the return packet to its respective previous waypoint.

When the first waypoint, i.e., AIPR 1 408, receives the return packet, the waypoint may restore the return packet to its original form, i.e., the form the return packet had when the destination service 428 sent the return packet, or as the packet might have been modified by the router 430, such as a result of network address translation (NAT) performed by the router 430. Recall that the first waypoint set a flag in its database to indicate the lead packet had not traversed any other waypoint before reaching the first waypoint. This flag is used to signal the first waypoint to restore the return packet and forward the restored return packet to the source client 426. The first waypoint forwards the return packet to the source client 426. Subsequent return packets are similarly handled.

In the third scenario, not shown in FIG. 10, the last AIPR to receive the lead packet has a network address equal to the network address of the destination service. For example, the destination service network address may be given to a gateway router/AIPR, and the gateway router/AIPR may either process the service request or its router table may cause the packet to be forwarded to another node to perform the service. The last AIPR may restore the lead packet and subsequent packets, as described above.

It should be noted that although preferred embodiments use stateful routing as noted above, other embodiments do not use stateful routing.

Lead Packet Identification

As noted, a waypoint should be able to identify a lead packet of a session. Various techniques may be used to identify lead packets. Some of these techniques are protocol-specific. For example, a TCP session is initiated according to a well-known three-part handshake involving a SYN packet, a SYN-ACK packet and an ACK packet. By statefully following packet exchanges between pairs of nodes, a waypoint can identify a beginning of a session and, in many cases, an end of the session. For example, A TCP session may be ended by including a FIN flag in a packet and having the other node send an ACK, or by simply including an RST flag in a packet. Because each waypoint stores information about each session, such as the source client/destination service network address/port number pairs, the waypoint can identify the session with which each received packet is associated. The waypoint can follow the protocol state of each session by monitoring the messages and flags, such as SYN and FIN, sent by the endpoints of the session and storing state information about each session in its database. Such stateful monitoring of packet traffic is not taught by the prior art known to the inventor. Instead, the prior art teaches away from this type of session.

It should be noted that a SYN packet may be re-transmitted—each SYN packet does not necessarily initiate a separate session. However, the waypoint can differentiate between SYN packets that initiate a session and re-transmitted SYN packets based on, for example, the response packets.

Where a protocol does not define a packet sequence to end a session, the waypoint may use a timer. After a predetermined amount of time, during which no packet is handled for a session, the waypoint may assume the session is ended. Such a timeout period may also be applied to sessions using protocols that define end sequences.

Table 2 describes exemplary techniques for identifying the beginning and end of a session, according to various protocols. Similar techniques may be developed for other protocols, based on the definitions of the protocols.

TABLE 2

| Protocol | Destination Port | Technique for Start/End Determination |
| --- | --- | --- |
| TCP | Any | Detect start on the first SYN packet from a new address/port unique within the TCP protocol's guard time between address/port reuse. Following the TCP state machine to determine an end (FIN exchange, RST, or guard timeout). |
| UDP-TFTP | 69 | Trap on the first RRQ or WRQ message to define a new session, trap on an undersized DAT packet for an end of session. |
| UDP-SNMP | 161, 162 | Trap on the message type, including GetRequest, SetRequest, GetNextRequest, GetBulkRequest, InformRequest for a start of session, and monitor the Response for end of session. For SNMP traps, port 162 is used, and the flow of data generally travels in the "reverse" direction. |
| UDP-SYSLOG | 514 | A single message protocol, thus each message is a start of session, and end of session. |
| UDP-RTP | Any | RTP has a unique header structure, which can be reviewed/analyzed to identify a start of a session. This is not always accurate, but if used in combination with a guard timer on the exact same five-tuple address, it should work well enough. The end of session is detected through a guard timer on the five-tuple session, or a major change in the RTP header. |
| UDP-RTCP | Any | RTCP also has a unique header, which can be reviewed, analyzed, and harvested for analytics. Each RTCP packet is sent periodically and can be considered a "start of session" with the corresponding RTCP response ending the session. This provides a very high quality way of getting analytics for RTCP at a network middle point, without using a Session Border Controller |
| UDP-DNS (Nameserver) | 53 | Each DNS query is a single UDP message and response. By establishing a forward session (and subsequent backward session) the Augmented router gets the entire transaction. This allows analytics to be gathered and manipulations that are appropriate at the Augmented router. |
| UDP-NTP | 123 | Each DNS query/response is a full session. So, each query is a start, and each response is an end. |

Figure 11:
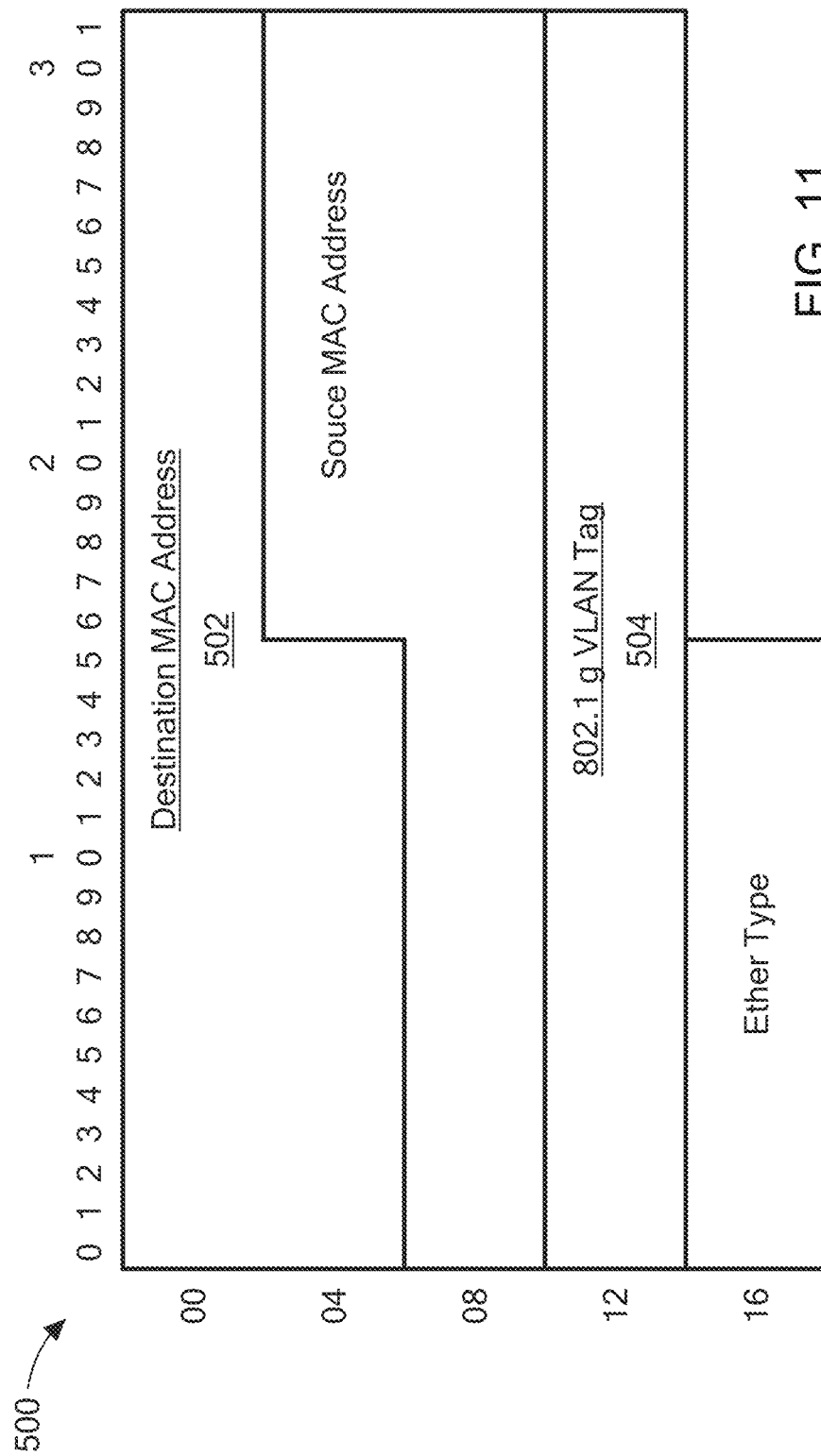
FIG. 11 schematically shows a layout of an Ethernet header, identifying fields used for identifying a beginning of a session, according to an embodiment of the present invention.
Figure 12:
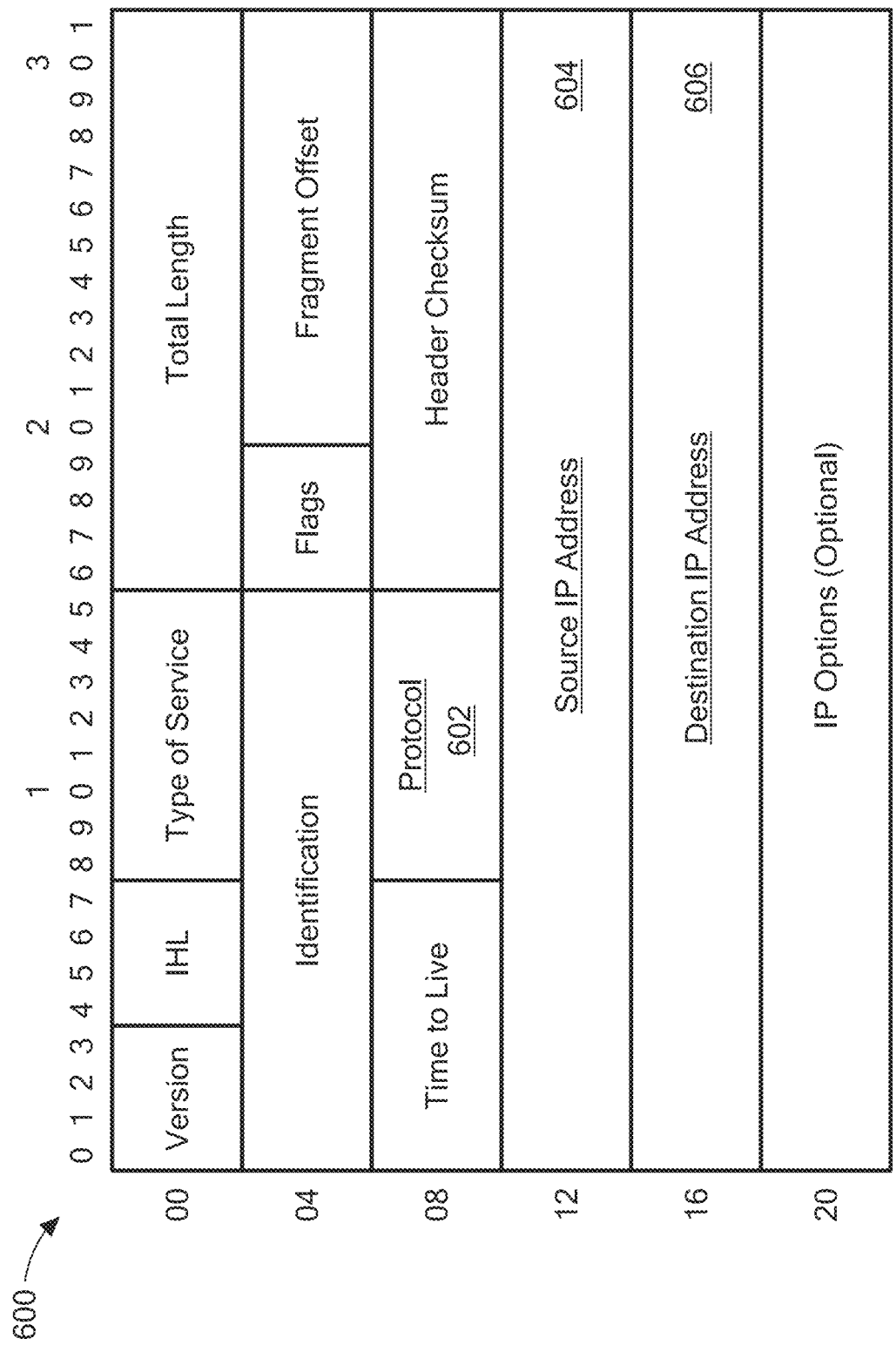
FIG. 12 schematically shows a layout of an IP header, identifying fields used for identifying a beginning of a session, according to an embodiment of the present invention.
Figure 13:
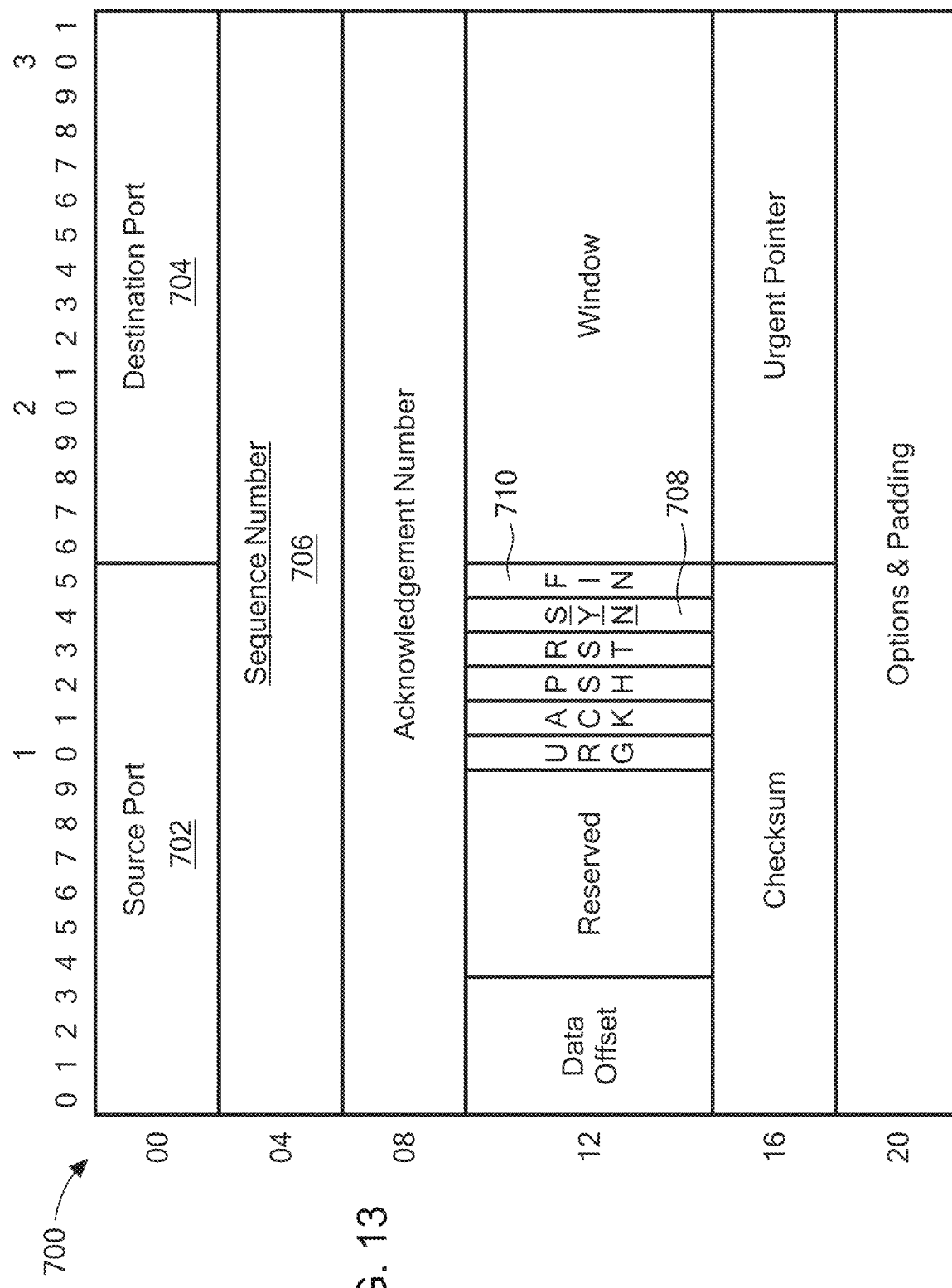
FIG. 13 schematically shows a layout of a TCP header, identifying fields used for identifying a beginning of a session, according to an embodiment of the present invention.

FIG. 11 is a schematic layout of an Ethernet header 500, including a Destination MAC Address 502 and an 802.1q VLAN Tag 504. FIG. 12 is a schematic layout of an IP header 600, including a Protocol field 602, a Source IP Address 604 and a Destination IP Address 606. FIG. 13 is a schematic layout of a TCP header 700, including a Source Port 702, a Destination Port 704, a Sequence Number 706, a SYN flag 708 and a FIN flag 710. These packets and the identified fields may be used to identify the beginning of a session, as summarized in Table 3.

TABLE 3

| Data Item | Where From | Description |
| --- | --- | --- |
| Physical Interface | Ethernet Header | This is the actual port that the message was received on, which can be associated or discerned by the Destination MAC Address |
| Tenant | Ethernet Header OR Source MAD Address & Previous Advertisement | Logical association with a group of computers. |
| Protocol | IP Header | This defines the protocol in use and, for the TCP case, it must be set to a value that corresponds to TCP |
| Source IP Address | IP Header | Defines the source IP Address of the initial packet of a flow. |
| Destination IP Address | IP Header | Defines the destination IP Address of the initial packet of a flow. |
| Source Port | TCP Header | Defines the flow instance from the source. This may reflect a client, a firewall in front of the client, or a carrier grade NAT. |
| Destination Port | TCP Header | This defines the desired service requested, such as 80 for HTTP. |
| Sequence Number | TCP Header | This is a random number assigned by the client. It may be updated by a firewall or carrier grade NAT. |

TABLE 3-continued

| Data Item | Where From | Description |
| --- | --- | --- |
| SYN Bit On | TCP Header | When the SYN bit is on, and no others, this is an initial packet of a session. It may be retransmitted if there is no response to the first SYN message. |

Augmented IP Router (AIPR)

Figure 14:
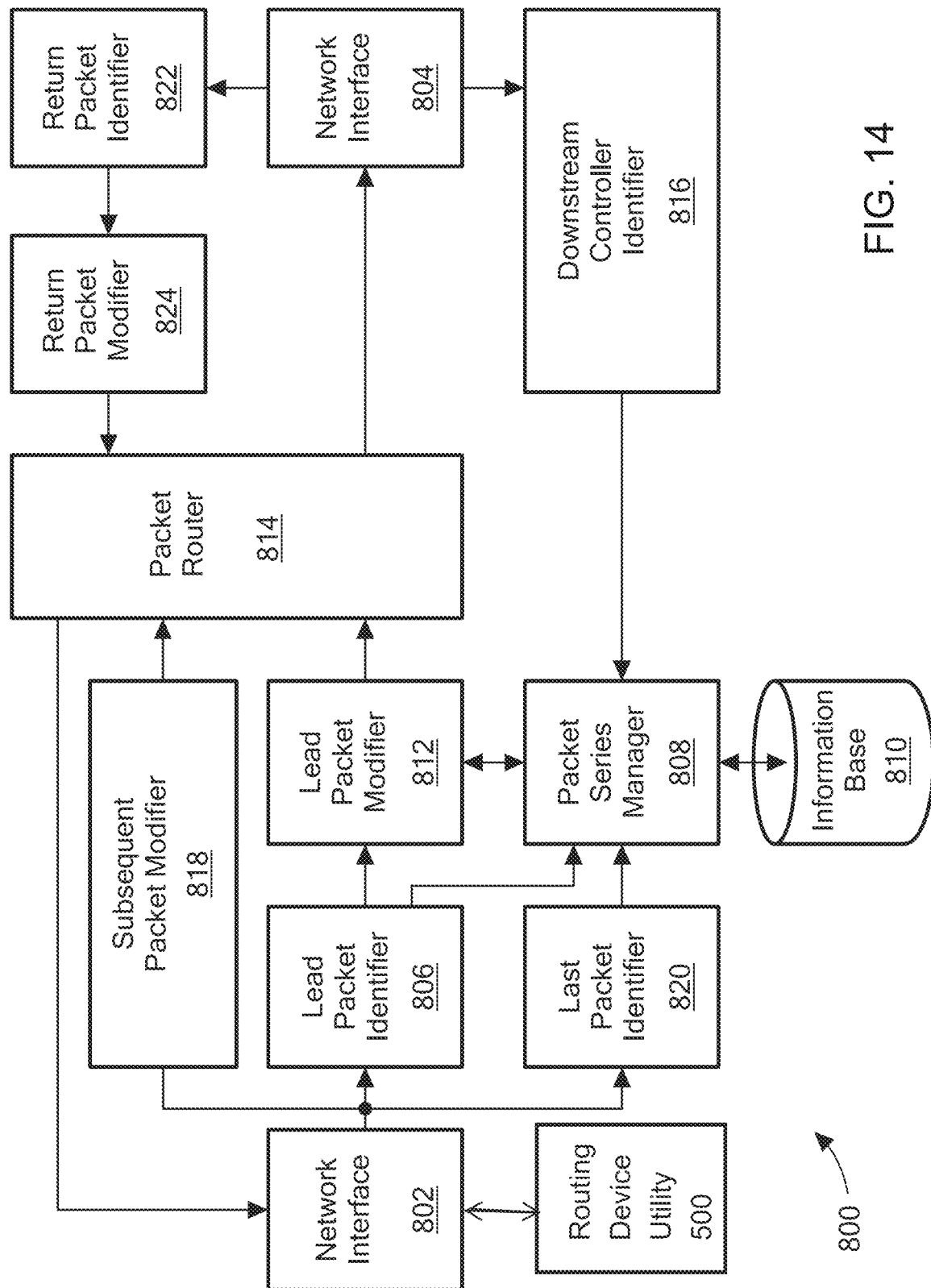
FIG. 14 schematically shows a block diagram of an AIPR of FIG. 8, according to an embodiment of the present invention.

FIG. 14 is a schematic block diagram of an AIPR (waypoint) 800 configured in accordance with illustrative embodiments of the invention. The AIPR 800 includes at least two network interfaces 802 and 804, through which the AIPR 800 may be coupled to two networks. The interfaces 802 and 804 may be, for example, Ethernet interfaces. The AIPR 800 may send and receive packets via the interfaces 802 and 804.

A lead packet identifier 806 automatically identifies lead packets, as discussed herein. In general, the lead packet identifier 806 identifies a lead packet when the lead packet identifier 806 receives a packet related to a session that is not already represented in the AIPR's information base 810, such as a packet that identifies a new source client/destination service network address/port number pair. As noted, each lead packet is an initial, non-dropped, packet of a series of packets (session). Each session includes a lead packet and at least one subsequent packet. The lead packet and all the subsequent packets are sent by the same source client toward the same destination service, for forward flow control. For forward and backward flow control, all the packets of the session are sent by either the source client or the destination service toward the other.

A session (packet series) manager 808 is coupled to the lead packet identifier 806. For each session, the session manager assigns a unique identifier. The unique identifier may be, for example, a combination of the network address of the AIPR 800 or of the interface 802, in combination with a first port number assigned by the session manager 808 for receiving subsequent packets of this session. The unique identifier may further include the network address of the AIPR 800 or of the other interface 804, in combination with a second port number assigned by the session manager 808 for transmitting the lead packet and subsequent packets. This unique identifier is associated with the session. The session manager 808 stores information about the session in an information base 810. This information may include the unique identifier, in association with the original source client/destination service network address/port number pairs.

Figure 15:
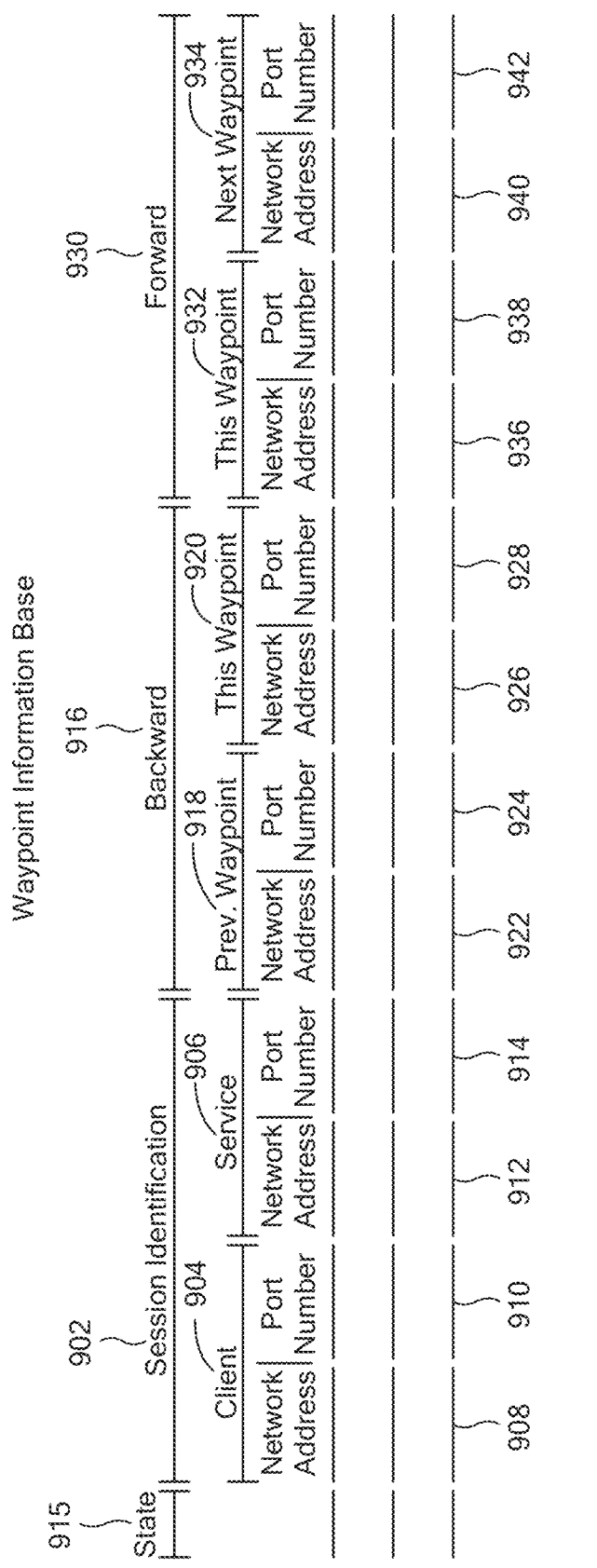
FIG. 15 shows a schematic illustration of information stored in an information base by the AIPR of FIGS. 10 and 14, according to an embodiment of the present invention.

FIG. 15 is a schematic layout of an exemplary waypoint information base 900. Each row represents a session. A session identification column 902 includes sub-columns for the source client 904 and the destination service 906. For each client 904, its network address 908 and port number 910 are stored. For each destination service 906, its network address 912 and port number 914 are stored. This information is extracted from the lead packet.

State information about the session may be stored in a state column 915. This information may be used to statefully follow a series of packets, such as when a session is being initiated or ended.

A backward column includes sub-columns for storing information 916 about a portion of the backward path, specifically to the previous AIPR. The backward path information 916 includes information 918 about the previous AIPR and information 920 about the present AIPR 800. The information 918 about the previous AIPR includes the AIPR's network address 922 and port number 924. The session manager 808 extracts this information from the lead packet, assuming the lead packet was forwarded by an AIPR. If, however, the present AIPR 800 is the first AIPR to process the lead packet, the information 918 is left blank as a flag. The information 920 about the present AIPR 800 includes the network address 926 of the interface 802 over which the lead packet was received, as well as the first port number 928 assigned by session manager 808.

The waypoint information base 900 is also configured to store information 930 about a portion of the forward path, specifically to the next AIPR. This information 930 includes information 932 about the present AIPR 800 and information 934 about the next AIPR along the path, assuming there is a next AIPR. The information 932 includes the network address 936 of the interface over which the present AIPR will send the lead packet and subsequent packets, as well as the second port number 938 assigned by the session manager 808. The information 934 about the next AIPR along the path may not yet be available, unless the AIPR is provisioned with information about the forward path. The information 934 about the next AIPR includes its network address 940 and port number 942. If the information 934 about the next AIPR is not yet available, the information 934 may be filled in when the AIPR 800 processes a return packet, as described below.

Some embodiments of the waypoint information base 900 may include the forward information 930 without the backward information 916. Other embodiments of the waypoint information base 900 may include the backward information 916 without the forward information 930. Statistical information may be gathered and/or calculated using either or both forward and backward information 916.

Returning to FIG. 14, a lead packet modifier 812 is coupled to the session manager 808. The lead packet modifier 812 modifies the lead packet to store the unique identifier associated with the session. The original source client network address/port number pair, and the original destination service network address/port number pair, are stored in the modified lead packet, if necessary. The lead packet may be enlarged to accommodate the additional information stored therein, or existing space within the lead packet, such as a vendor specific attribute field, may be used. Other techniques for transmitting additional information are protocol specific, for example with TCP, the additional information could be transmitted as a TCP Option field, or added to the SYN packet as data. In either case, the term session data block is used to refer to the information added to the modified lead packet.

Figure 16:
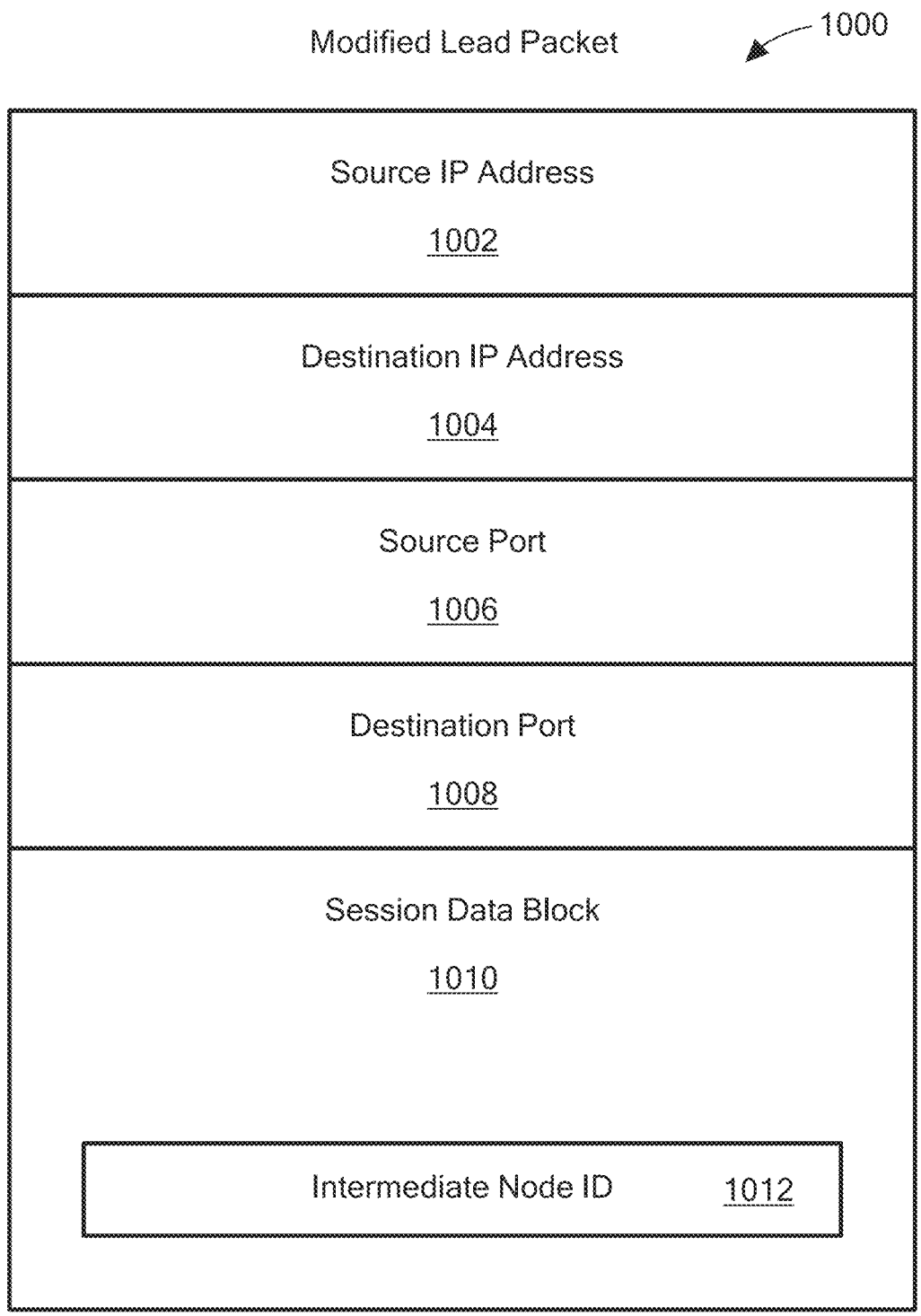
FIG. 16 schematically shows a modified lead packet produced by the AIPR of FIG. 11, according to an embodiment of the present invention.

FIG. 16 is a schematic diagram of an exemplary modified lead packet 1000 showing the original source and destination IP addresses 1002 and 1004, respectively, and the original source and destination port numbers 1006 and 1008, respectively. FIG. 16 also shows a session data block 1010 in the modified lead packet 1000. Although the session data block 1010 is shown as being contiguous, it may instead have its contents distributed throughout the modified lead packet 1000. The session data block 1010 may store an identification of the sending AIPR, i.e., an intermediate node identifier 1012, such as the network address of the second network interface 804 and the second port number.

Returning to FIG. 14, the lead packet modifier 812 updates the packet length, if necessary, to reflect any enlargement of the packet. The lead packet modifier 812 updates the checksum of the packet to reflect the modifications made to the packet. The modified lead packet is then transmitted by a packet router 814, via the second network interface 804. The modified lead packet is naturally routed, unless the AIPR 800 has been provisioned with forward path information.

Eventually, the destination service sends a return packet. The AIPR 800 receives the return packet via the second interface 804. If another AIPR (downstream AIPR) between the present AIPR 800 and the destination service handles the lead packet and the return packet, the downstream AIPR modifies the return packet to include the downstream AIPR's network address and a port number. A downstream controller 816 identifier uses stateful inspection, as described herein, to identify the return packet. The downstream controller 816 stores information 934 (FIG. 15), specifically the network address and port number, about the next AIPR in the waypoint information base 900.

The present AIPR 800 may use this information to address subsequent packets to the next AIPR. Specifically, a subsequent packet modifier 818 may set the destination address of the subsequent packets to the network address and port number 940 and 942 (FIG. 15) of the next waypoint, instead of directly to the destination service. The packet router 814 sends the subsequent packets, according to their modified destination addresses. Thus, for each series of packets, subsequent packets flow through the same downstream packet flow controllers as the lead packet of the series of packets.

A last packet identifier 820 statefully follows each session to identify an end of each stream, as discussed above. As noted, in some cases, the end is signified by a final packet, such as a TCP packet with the RST flag set or a TCP ACK packet in return to a TCP packet with the FIN flag set. In other cases, the end may be signified by a timer expiring. When the end of a session is detected, the packet series manager 808 disassociates the unique identifier from the session and deletes information about the session from the waypoint information base 900.

Where the AIPR 800 is provisioned to be a last AIPR before a destination service, the lead packet modifier 806 restores the lead packet to the state the lead packet was in when the source client sent the lead packet, or as the lead packet was modified, such as a result of network address translation (NAT). Similarly, the subsequent packet modifier 818 restores subsequent packets.

Similarly, if the destination address of the lead packet is the same as the network address of the AIPR 800, or its network interface 802 over which it receives the lead packets, the lead packet modifier 806 and the subsequent packet modifier 818 restore the packet and subsequent packets.

As noted, in some protocols, several packets are required to initiate a session, as with the SYN-SYN/ACK-ACK handshake of the TCP. Thus, the downstream controller identifier 816 may wait until a second return packet is received from the destination service before considering a session as having started.

As noted, some embodiments of the waypoint 800 also manage return packet paths. The lead packet identifier 806 automatically ascertains whether a lead packet was forwarded to the waypoint 800 by an upstream waypoint. If the lead packet includes a session data block, an upstream waypoint forwarded the lead packet. The packet series manager 808 stores information about the upstream waypoint in the waypoint information base 810. A return packet identifier 822 receives return packets from the second network interface 804 and automatically identifies return packets of the session. These return packets may be identified by destination address and port number being equal to the information 932 (FIG. 15) in the waypoint information base corresponding to the session. A return packet modifier modifies the return packets to address them to the upstream waypoint for the session, as identified by the information 918 in the waypoint information base 900.

Figure 17:
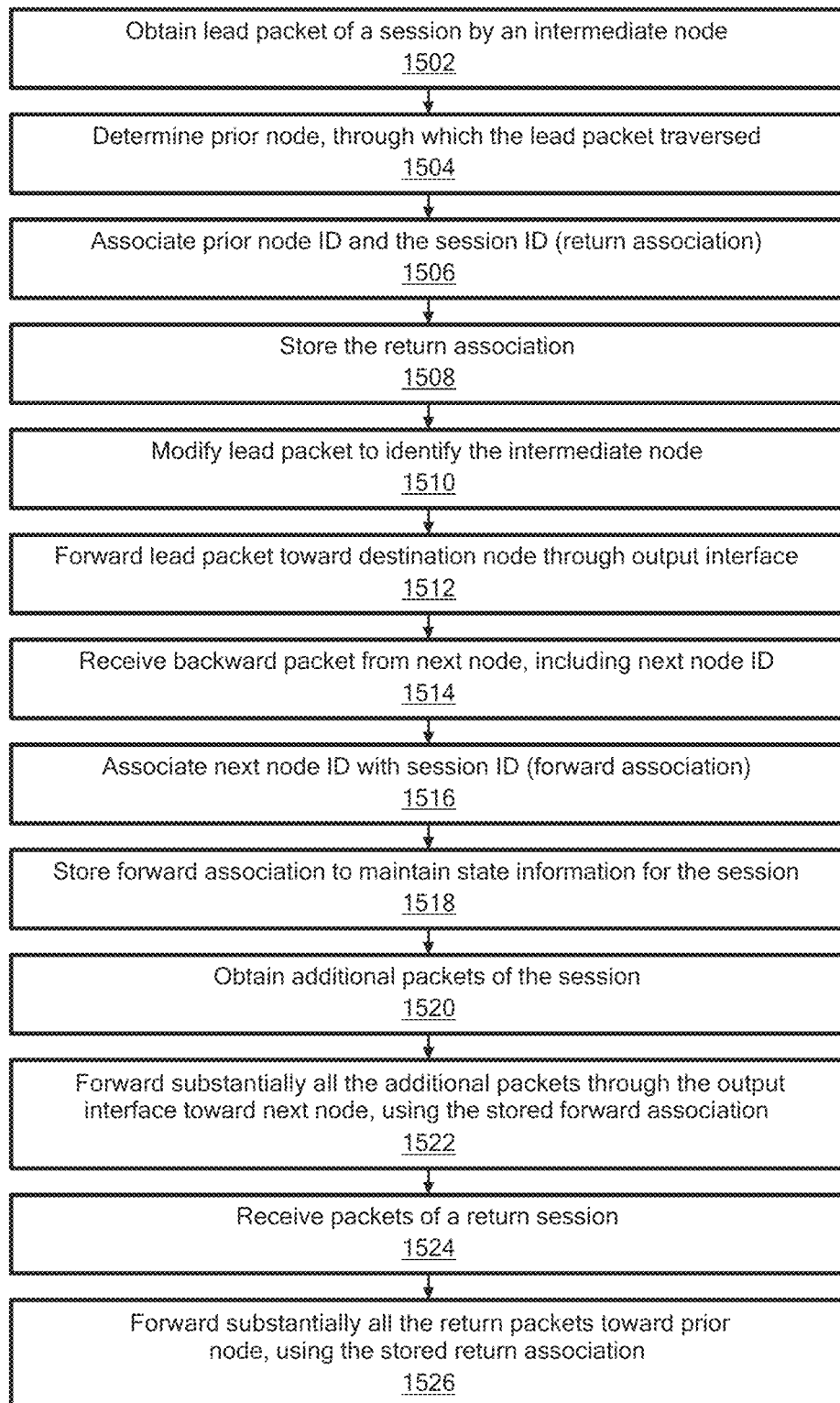
FIGS. 17 and 18 show flowcharts illustrating operations performed by the AIPR of FIGS. 10 and 14, according to an embodiment of the present invention.

FIG. 17 shows a flowchart schematically illustrating some operations performed by the AIPR 800 (FIG. 14) in accordance with illustrative embodiments of the invention. The flowchart illustrates a packet routing method for directing packets of a session from an originating node toward a destination node in an IP network. At step 1502, an intermediate node obtains a lead packet of a plurality of packets in a session. The intermediate node may include a routing device or a switching device that performs a routing function.

The packets in the session have a unique session identifier. At step 1504, a prior node, through which the lead packet traversed, is determined. The prior node has a prior node identifier. At step 1506, a return association is formed between the prior node identifier and the session identifier. At step 1508, the return association is stored in memory to maintain state information for the session.

At step 1510, the lead packet is modified to identify at least the intermediate node. At step 1512, the lead packet is forwarded toward the destination node though an intermediate node electronic output interface to the IP network. The electronic output interface is in communication with the IP network. At step 1514, a backward message (e.g., a packet, referred to as a "backward packet") is received through an electronic input interface of the intermediate node. The backward message is received from a next node. The next node has a next node identifier. The backward message includes the next node identifier and the session identifier. The electronic input interface is in communication with the IP network.

At step 1516, a forward association is formed between the next node identifier and the session identifier. At step 1518, the forward association is stored in memory, to maintain state information for the session. At step 1520, additional packets of the session are obtained. At step 1522, substantially all of the additional packets in the session are forwarded toward the next node, using the stored forward association. The additional packets are forwarded through the electronic output interface of the intermediate node.

At step 1524, a plurality of packets is received in a return session, or a return portion of the session, from the destination. The return session is addressed toward the originating node. At step 1526, substantially all the packets in the return session are forwarded toward the prior node, using the stored return association. The packets are forwarded through the electronic output interface.

Figure 18:
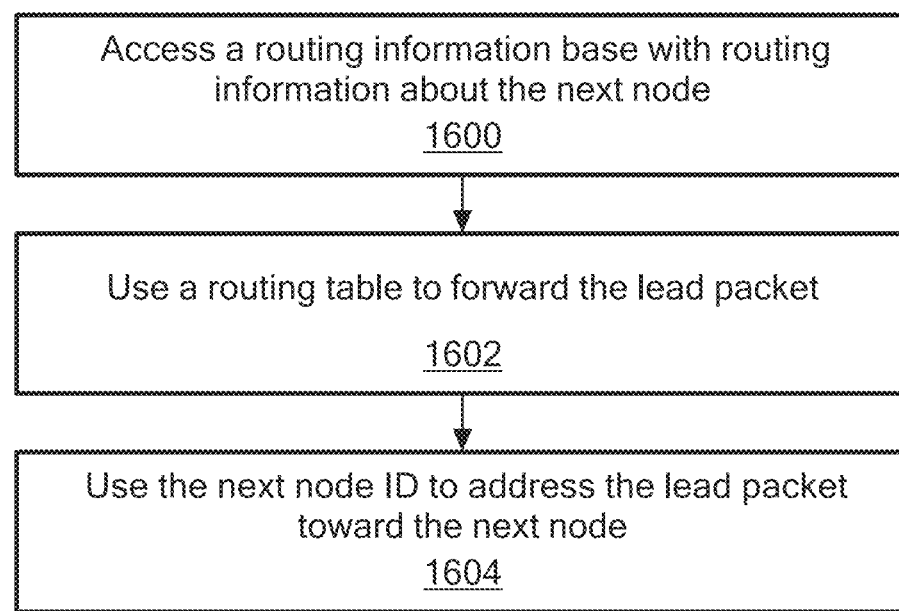

As shown at step 1600 in FIG. 18, forwarding the lead packet 1412 toward the destination node may include accessing a routing information base having routing information for the next node. As shown at step 1602, the intermediate node may have a routing table, and forwarding the lead packet 1412 toward the destination node may include using the routing table to forward the lead packet toward the destination node. As shown at step 1604, forwarding the lead packet 1412 toward the destination node may include using the next node identifier to address the lead packet toward the next node.

The lead packet may be addressed so that a plurality of network devices receive the lead packet after it is forwarded and before the next node receives the lead packet.

An AIPR 800 and all or a portion of its components 802-824 may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof. In a similar manner, the routing device utility 510 also may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A network device comprising:
one or more processors configured to:
  obtain, in response to receiving a request for a user to access a computer network, user information relating to the user, wherein the request comprises an initial packet of a session for a device of the user, and wherein the initial packet comprises a header for routing the initial packet to a destination address specified within the header;
  select, based on one or more features of the user information, a group routing policy for the user from a plurality of group routing policies;
  assign, based on the group routing policy, one or more routes for which the user is permitted to access the computer network; and
  send a modified packet comprising the header of the initial packet,
wherein the one or more processors are configured to construct the modified packet to include metadata inserted after the header and prior to an end of the initial packet, and
wherein the metadata of the modified packet comprises:
  (i) a first portion of metadata specifying a session identifier for the session associated with the packet, and
  (ii) a second portion of metadata specifying tenant information that controls forwarding of the modified packet and subsequent packets of the session by network devices of the computer network along the one or more routes for which the user is permitted to access the computer network, wherein the tenant information is associated with an organizational unit to which the user belongs.

2. The network device of claim 1, further comprising a policy database configured to store the plurality of group routing policies, wherein the one or more processors are configured to select each of the plurality of group routing policies based on a Boolean expression applied to the one or more features of the user information.

3. The network device of claim 1, wherein the one or more processors are further configured to:
receive one or more of the subsequent packets from the device for the session, wherein each of the subsequent packets includes a transport label having a destination address set by the device,
modify the one or more subsequent packets by rewriting the destination addresses within the header to destination addresses of the network devices along the one or more routes of the group routing policy.

4. The network device of claim 1, wherein the one or more processors are further configured to authenticate the user using the user information.

5. The network device of claim 1, wherein the user has an associated communication device, wherein the one or more processors are further configured to select the group routing policy based on one or more features of the associated communication device.

6. The network device of claim 1, wherein the plurality of group routing policies include:
a first group routing policy configured to permit access on link-layer routes without link restriction; and a second group routing policy configured to permit access on link-layer routes specified in the second group routing policy.

7. The network device of claim 1, wherein the plurality of group routing policies comprises a hierarchical set of group routing policies, at least one of the plurality of group routing policies having at least one sub-group routing policy.

8. The network device of claim 1, wherein to select the group routing policy for the user, the one or more processors are configured to apply a Boolean expression to the one or more features of the user information.

9. The network device of claim 1, wherein the user information comprises data specifying one or more of: (1) name, (2) organizational unit, (3) group, (4) employment status, (5) role in the organization unit, and (6) an access level for the user.

10. A method comprising:
obtaining, by a network device and in response to receiving a request for a user to access a computer network, user information relating to the user, wherein the request comprises an initial packet of a session for a device of the user, and wherein the initial packet comprises a header for routing the initial packet to a destination address specified within the header;
selecting, by the network device and based on one or more features of the user information, a group routing policy for the user from a plurality of group routing policies;
assigning, by the network device based on the group routing policy, one or more routes for which the device is permitted access within the computer network; and
sending, by the network device, a modified packet comprising the header of the initial packet,
wherein sending the modified packet comprises constructing the modified packet to include metadata inserted after the header and prior to an end of the initial packet, and wherein the metadata of the modified packet comprises:
(i) a first portion of metadata specifying a session identifier for the session associated with the packet, and
(ii) a second portion of metadata specifying tenant information that controls forwarding of the modified packet and subsequent packets of the session by network devices of the computer network along the one or more routes on which the user is permitted access within the computer network, wherein the tenant information is associated with an organizational unit to which the user belongs.

11. The method of claim 10, further comprising authenticating the user using the user information.

12. The method of claim 10, wherein the user has an associated communication device, wherein selecting the group routing policy further comprises selecting the group routing policy based on one or more features of the associated communication device.

13. The method of claim 10, wherein sending the packet comprises modifying the packet with one or more routes of the group routing policy.

14. The method of claim 10, wherein the plurality of group routing policies include:
a first group routing policy configured to permit access on link-layer routes without link restriction; and
a second group routing policy configured to permit access on link-layer routes specified in the second group routing policy.

15. The method of claim 10, wherein the plurality of group routing policies comprises a hierarchical set of group routing policies, at least one of the plurality of group routing policies having at least one sub-group routing policy.

16. The method of claim 10, wherein the group routing policy includes one or more of quality of service, bandwidth allocation, or bandwidth priority.

17. The method of claim 10, wherein the user information comprises data specifying one or more of: (1) name, (2) organizational unit, (3) group, (4) employment status, (5) role in the organization unit, and (6) an access level for the user.

18. A non-transitory computer-readable medium comprising instructions, that when executed by one or more processors of a network device, cause the one or more processors to:
obtain, in response to receiving a request for a device to access a computer network, user information relating to the user, wherein the request comprises an initial packet of a session for the device, and wherein the initial packet comprises a header for routing the initial packet to a destination address specified within the header;
select, based on one or more features of the user information, a group routing policy for the user from a plurality of group routing policies;
assign, based on the group routing policy, one or more routes for which the user is permitted access within the computer network; and
send a modified packet comprising the header of the initial packet,
wherein the instructions cause the one or more processors to construct the modified packet to include metadata inserted after the header and prior to an end of the initial packet, and wherein the metadata of the modified packet comprises:
(i) a first portion of metadata specifying a session identifier for the session associated with the packet, and
(ii) a second portion of metadata specifying tenant information that controls to control forwarding of the modified packet and subsequent packets of the session by network devices of the computer network along the one or more routes on which the user is permitted access within the computer network, wherein the tenant information is associated with an organizational unit to which the user belongs.

19. The non-transitory computer-readable medium of claim 18, wherein the one or more processors are further configured to authenticate the user using the user information.

20. The non-transitory computer-readable medium of claim 18, wherein the user has an associated communication device, wherein the one or more processors are further configured to select the group routing policy based on one or more features of the associated communication device.

21. The non-transitory computer-readable medium of claim 18, wherein the one or more processors are further configured to modify the packet with the one or more routes of the group routing policy.

22. The non-transitory computer-readable medium of claim 18, wherein the plurality of group routing policies comprises a hierarchical set of group routing policies, at least one of the plurality of group routing policies having at least one sub-group routing policy.

23. The non-transitory computer-readable medium of claim 18, wherein the user information comprises data specifying one or more of: (1) name, (2) organizational unit, (3) group, (4) employment status, (5) role in the organization unit, and (6) an access level for the user.

* * * * *